(12) United States Patent
Unice et al.

(10) Patent No.: US 12,458,118 B2
(45) Date of Patent: Nov. 4, 2025

(54) ADVANCED TREKKING STAFF

(71) Applicants: Lowe Unice, Lindon, UT (US); Cole Unice, Lindon, UT (US); Weston Unice, Lindon, UT (US); Scott Unice, Lindon, UT (US)

(72) Inventors: Lowe Unice, Lindon, UT (US); Cole Unice, Lindon, UT (US); Weston Unice, Lindon, UT (US); Scott Unice, Lindon, UT (US)

( * ) Notice: Subject to any disclaimer, the term of this patent is extended or adjusted under 35 U.S.C. 154(b) by 166 days.

(21) Appl. No.: 18/203,233

(22) Filed: May 30, 2023

(65) Prior Publication Data

US 2023/0380555 A1    Nov. 30, 2023

Related U.S. Application Data

(60) Provisional application No. 63/347,255, filed on May 31, 2022.

(51) Int. Cl.
*A45B 1/00* (2006.01)
*A45B 3/00* (2006.01)
(Continued)

(52) U.S. Cl.
CPC .................. *A45B 3/00* (2013.01); *A45B 1/00* (2013.01); *A45B 5/00* (2013.01); *A45B 9/02* (2013.01); *F16M 11/041* (2013.01); *F16M 11/16* (2013.01); *F16M 11/26* (2013.01); *F16M 13/06* (2013.01); *F16M 13/08* (2013.01); *A45B 2009/002* (2013.01); *A45B 2009/007* (2013.01); *A45B 2200/055* (2013.01)

(58) Field of Classification Search
CPC . A45B 2200/05; A45B 2200/055; A45B 3/00; A45B 1/00; A45B 5/00; F16M 13/04; F16M 13/06; F16M 13/08
USPC ................ 135/66, 78; 248/155, 163.1, 165; 396/419
See application file for complete search history.

(56) References Cited

U.S. PATENT DOCUMENTS

| | | | | |
|---|---|---|---|---|
| 513,058 A | * | 1/1894 | Rahmer | A45B 5/00 248/188.5 |
| 648,123 A | * | 4/1900 | Goerz | A45B 5/00 135/65 |

(Continued)

OTHER PUBLICATIONS

PDF of the Written Opinion mailed Aug. 15, 2023 for PCT/US2023/024056. (Year: 2023).*

(Continued)

*Primary Examiner* — Robert Canfield
(74) *Attorney, Agent, or Firm* — Bamert Regan PLLC

(57) ABSTRACT

An advanced trekking staff includes a main shaft, secondary shaft, tip shaft, a housing, and a plurality of concentric shafts. The plurality concentric shafts are slidably disposed within the interior cavity of the main shaft. The main shaft and tip shaft are slidably disposed on the secondary shaft. The main shaft may be raised and lowered and secured to a variable position to the tip shaft within the secondary shaft sleeved on the tip shaft to lengthen the main shaft as desired. A first configuration includes the plurality concentric shafts disposed within the interior cavity of the main shaft to form a trekking staff A second configuration includes the two concentric shafts received by the housing coupled to the main shaft so as to form a tripod.

22 Claims, 24 Drawing Sheets

(51) Int. Cl.
*A45B 5/00* (2006.01)
*A45B 9/02* (2006.01)
*F16M 11/04* (2006.01)
*F16M 11/16* (2006.01)
*F16M 11/26* (2006.01)
*F16M 13/06* (2006.01)
*F16M 13/08* (2006.01)
*A45B 9/00* (2006.01)

(56) References Cited

U.S. PATENT DOCUMENTS

| | | | | |
|---|---|---|---|---|
| 657,947 | A * | 9/1900 | Shipway | A45B 1/00 248/188.91 |
| 673,482 | A * | 5/1901 | MacGill | A45B 1/00 135/66 |
| 743,320 | A * | 11/1903 | Otto | A45B 5/00 248/188.5 |
| 806,522 | A * | 12/1905 | Clark | A45B 5/00 248/412 |
| 1,063,106 | A * | 5/1913 | Bell | A45B 5/00 248/168 |
| 1,138,417 | A * | 5/1915 | Rottenberg | A45B 3/00 248/187.1 |
| 1,319,397 | A * | 10/1919 | Kelsey | A45B 5/00 D3/7 |
| 1,679,267 | A * | 7/1928 | Rieger | F16M 13/00 248/166 |
| 4,135,536 | A * | 1/1979 | Willis | A45B 9/04 135/84 |
| 4,809,725 | A * | 3/1989 | Champigny | A61H 3/02 135/75 |
| 6,085,766 | A * | 7/2000 | Geary | A63C 11/221 135/71 |
| 6,328,048 | B1 * | 12/2001 | Rivera, Sr. | A45B 3/00 223/118 |
| 10,856,629 | B1 * | 12/2020 | Uncie et al. | |
| 11,696,627 | B2 * | 7/2023 | Chen | A45B 9/02 135/65 |
| 2005/0207749 | A1 * | 9/2005 | Barker | F16M 11/28 396/428 |
| 2008/0011344 | A1 * | 1/2008 | Barker | G03B 17/561 135/66 |
| 2011/0011432 | A1 * | 1/2011 | Yakos | A45B 9/04 135/77 |
| 2020/0337424 | A1 * | 10/2020 | Friederich | A45B 9/02 |
| 2020/0390204 | A1 * | 12/2020 | Ballentine | F16M 11/24 |
| 2024/0353198 | A1 * | 10/2024 | Swensen | A45F 3/04 |

OTHER PUBLICATIONS

PDF of the International Search Report mailed Aug. 15, 2023 for OCT/US2023/024056. (Year: 2023).*

* cited by examiner

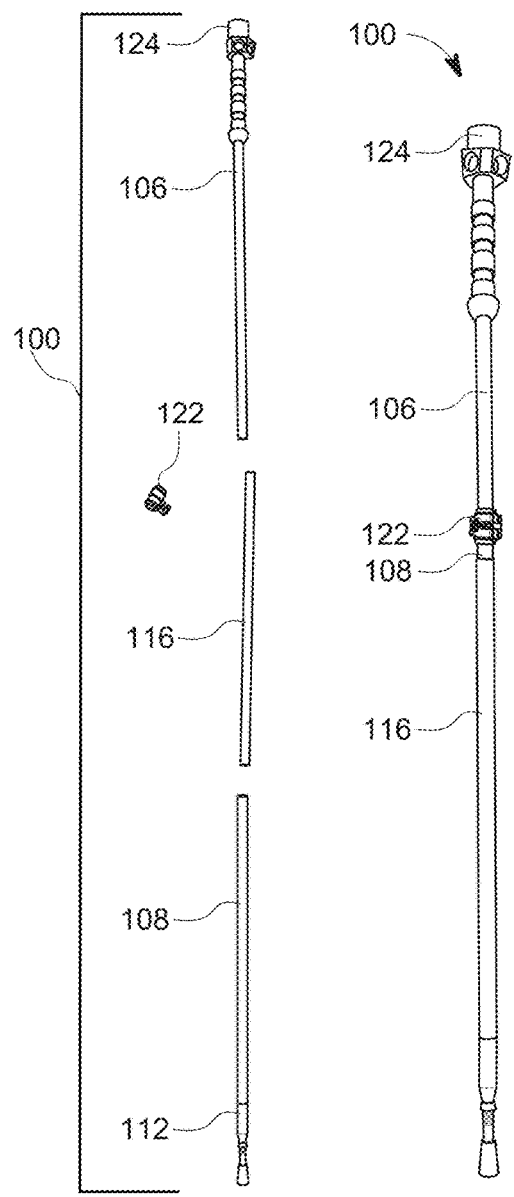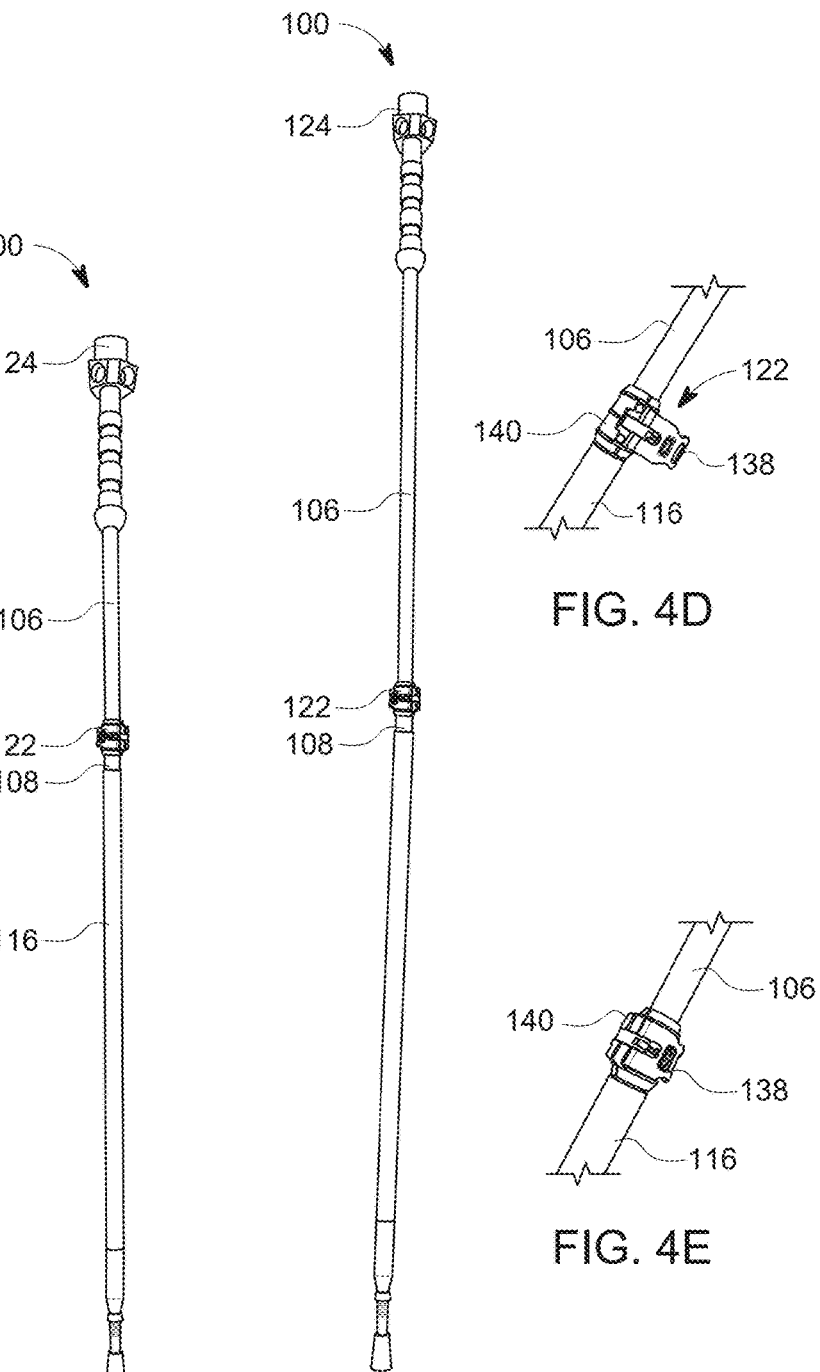
FIG. 4A  FIG. 4B  FIG. 4C

ADVANCED TREKKING STAFF

RELATED APPLICATIONS

This non-provisional application is related to and claims the benefit of U.S. Provisional Patent Application No. 63/347,255, entitled "ADVANCED TREKKING STAFF," filed on May 31, 2022, which is hereby incorporated by reference herein, in its entirety.

BACKGROUND

Hikers and climbers use trekking staffs because they are lightweight supports that provide health benefits and stability on rough terrain. A trekking staff may include an elongate shaft that offers a lightweight support for maintaining a stride or pace, providing a boost uphill, and taking shock off knees for a descent, among other benefits.

BRIEF DESCRIPTION OF THE DRAWINGS

FIG. 4A illustrates an exploded view of lengthening components of an advanced trekking staff according to an example of the principles described herein.

FIG. 4B illustrates the components in an assembled trekking staff configuration according to an example of the principles described herein.

FIG. 4C illustrates the components in a lengthened, assembled trekking staff configuration according to an example of the principles described herein.

FIG. 4D illustrates an example clamp in an open position, according to an example of the principles described herein.

FIG. 4E illustrates an example clamp in a closed position, according to an example of the principles described herein.

DETAILED DESCRIPTION

Figure 1:
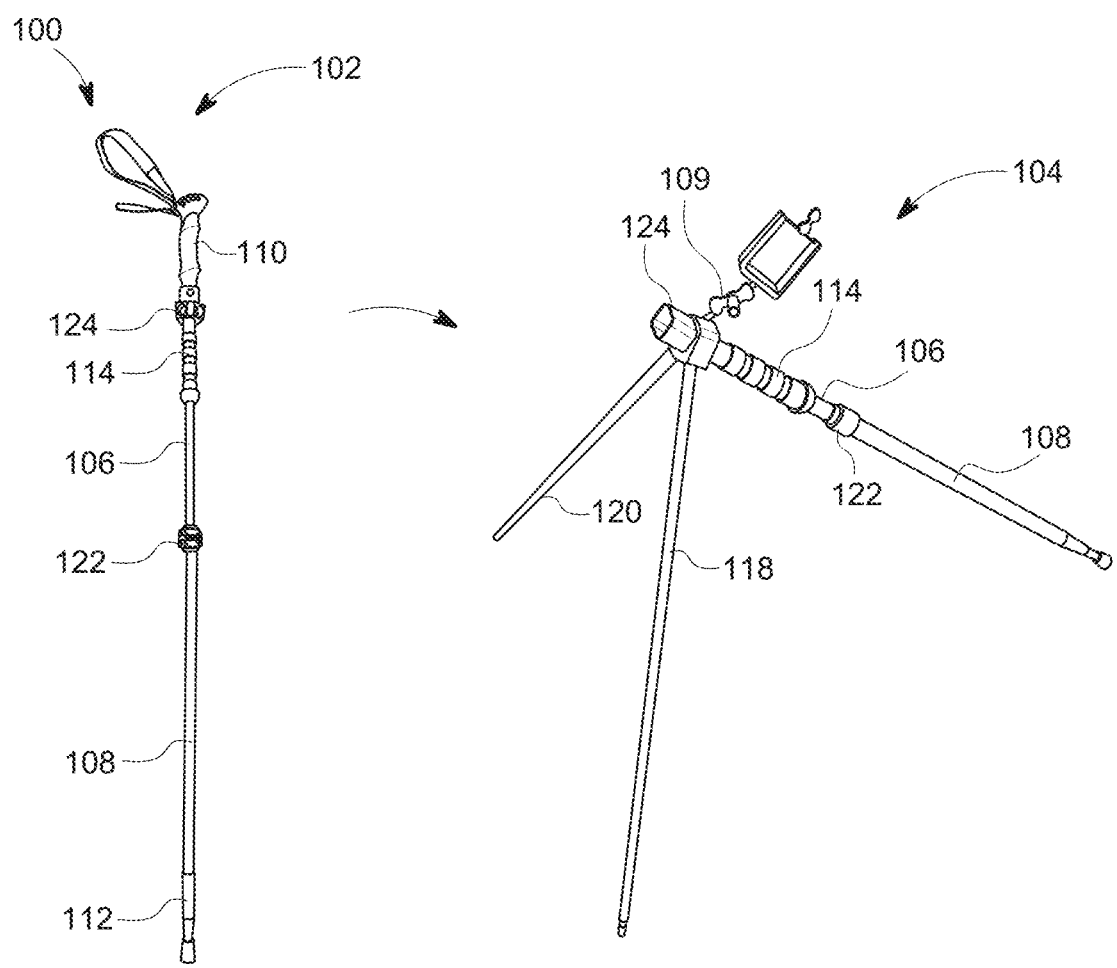
FIG. 1 illustrates an advanced trekking staff in two configurations according to an example of the principles described herein.

The following relates to convertible trekking staffs that provide multiple benefits. Because it may be desirable for hikers to have minimal items to carry, the convertible trekking staff serves more than one purpose.

Trekking staffs are lightweight supports that provide health benefits and stability on rough terrain. Using trekking staffs, hikers and climbers more easily reach high mountain peaks and cross low valleys for once-in-a-lifetime adventures.

While exploring the great outdoors with their trekking staffs, hikers often want to capture the glorious nature about them in photos, video, or other social media. They may be with friends and family and want a memory they can have together and share with others. They may wish to capture pictures that include all members of the group. This desire to take pictures and make memories is further compounded by a growing abundance of selfies, selfie sticks, mobile devices and the like that enable users to readily take their own pictures. With few items stowed away in daypacks, hikers may simply resort to using unstable logs, river bed rocks, or other nearby objects that fail to provide stable support for expensive cameras and mobile devices. Examples of trekking staffs are now described that provide the kind of support needed for photographic endeavors as well as additional transport needs.

An example advanced trekking staff is described. The trekking staff includes a main shaft having an interior cavity. The trekking staff also includes two concentric shafts to be removably disposed within the interior cavity of the main shaft. The trekking staff further includes a tip shaft having an interior cavity. The main shaft is to be removably disposed within the interior cavity of the tip shaft. In other words, the main shaft may slide within the tip shaft such that the main shaft is removable from the tip shaft. The trekking staff also includes a housing coupled to the main shaft over the interior cavity of the main shaft, the housing to receive the two concentric shafts to form a tripod, the housing including a T-slot to receive an adapter.

In another example, an advanced trekking staff includes a main shaft with a hollow interior cavity. Two concentric shafts are removably disposed within the interior cavity of the main shaft. A tip shaft has an interior cavity. The main shaft is slidably disposed within the interior cavity of the tip shaft. A secondary shaft has a hollow interior that removably receives the tip shaft and main shaft, the secondary shaft to be supported by a tip of the tip shaft. A locking member secures the main shaft at a variable position on the tip shaft and thus provides the trekking staff with a variable length. For example, the locking member may securely clamp the tip shaft to the main shaft. A housing is coupled to the main shaft over the interior cavity of the main shaft. The housing includes an engagement structure to receive the two concentric shafts to form a tripod. In a first configuration, the two concentric shafts are disposed within the interior cavity to form a trekking staff configuration. In a second configuration, the two concentric shafts are removed from the main shaft and the two concentric shafts are received by the engagement structure of the housing so as to form a tripod configuration; a holder to be removably coupled to the housing; and the secondary shaft to be removed from the tip shaft and removably coupled to the holder to form a vertical attachment.

In yet another example, an advanced trekking staff includes a main shaft with a hollow interior cavity. A plurality of concentric shafts are disposed within the interior cavity of the main shaft. A tip shaft has an interior cavity, the main shaft to be slidably disposed within the interior cavity of the tip shaft. A locking member secures the main shaft at a desired position on the tip shaft and thus provides the trekking staff with a desired length. A housing couples to the main shaft over the interior cavity of the main shaft. The housing includes an engagement structure to receive the plurality of concentric shafts to form a tripod configuration. A handle device is removably coupled to the housing, the handle device having a hollow interior. In a first configuration, the handle device is coupled to the housing and the plurality of concentric shafts are disposed within the interior cavity of the main shaft to form a trekking staff configuration. In a second configuration, the handle device is removed from the housing and the plurality of concentric shafts are received by the engagement structure of the housing to form the tripod configuration.

Turning to FIG. 1, an advanced trekking staff 100 is shown in a trekking staff configuration 102 with an arrow pointing to its converted form in a tripod configuration 104. The trekking staff configuration 102 is also referred to herein as a first configuration of the advanced trekking staff 100. The tripod configuration 104 is also referred to herein as a second configuration of the advanced trekking staff 100.

The trekking staff 100, in the trekking staff configuration 102, is a generally elongate, rod-like member that includes a main shaft 106 and a tip shaft 108 with a tip 112 that is pointed or otherwise defined to contact a ground surface. In some examples, the trekking staff 100 includes a handle device 110 or other gripping structure at one end of the main shaft 106. In some examples, at least one grip 114 may be located along the elongate member and is configured to be grasped to hold the trekking staff 100. The trekking staff 100 also includes a secondary shaft 116 having a hollow interior that removably receives the tip shaft 108 and the main shaft 106. While in the trekking staff configuration 102, the secondary shaft 116 may be supported at one end by a tip 112 of the tip shaft 108.

The main shaft 106 has an interior cavity that stores a first concentric shaft 118 and a second concentric shaft 120. The tip shaft 108 has an interior cavity for the main shaft 106 to be slidably inserted into the tip shaft 108. The main shaft 106 is locked at a variable position along the tip shaft 108 to provide a desired length of the trekking staff 100. In some examples, the end portions of the main shaft 106 and tip shaft 108 are slidably disposed within the secondary shaft 116. In some examples, one or more end portions of the main shaft 106 or tip shaft 108 project out of the secondary shaft 116 when in the trekking staff configuration 102.

In some examples, the trekking staff 100 includes a locking member 122 to secure the main shaft 106 at a variable position on the tip shaft 108. The locking member 122 may, thus, provide the trekking staff 100 with a variable length.

To convert the trekking staff 100 to the tripod configuration 104, the locking member 122 is unlocked to allow the tip shaft 108 to slide on the main shaft 106. The tip shaft 108 may slide upon the main shaft 106 to adjust the length of the trekking shaft 100. The handle device 110 is removed from the housing 124 at the top of the main shaft 106. The concentric shafts 118, 120 are removed through the housing 124 from within the interior cavity of the main shaft 106. As shown, the first concentric shaft 118 and the second concentric shaft 120 are then attached to the housing 124 coupled to the main shaft 106. The housing 124 includes an engagement structure 126 for attaching the concentric shafts 118, 120 in the tripod configuration 104. The engagement structure 126 may include threaded holes or other structures to receive the concentric shafts 118, 120. In some examples, the housing 124 includes a T-slot or other structure receive an adapter 109. It should be noted that the handle device 110 may be reattached to the housing 124 while the trekking staff 100 is in the tripod configuration 104. In other words, once the concentric shafts 118, 120 are removed from the housing 124, the handle device 110 may be reattached to the housing 124.

It should be noted that upon removing the main shaft 106 from the tip shaft 108, the secondary shaft 116 may then be separated from the tip shaft 108. In some examples, the locking member 122 may be used to store the secondary shaft 116 on the tip shaft 116 for use in applications other than the tripod. For example, the secondary shaft 116 may be used to add vertical length to the trekking staff 100. The tip shaft 108 does not need to be removed from the main shaft 106 to convert the trekking staff 100 into the tripod configuration 104.

Stability is achieved in the tripod configuration 104 with the main shaft 106, tip shaft 108, and concentric shafts 118, 120 arranged in a tripod stance. In an example, a hiker may thus use the trekking staff 100 as a support during hiking and as a tripod for mounting various devices (e.g., a camera, a scope, etc.).

Figure 2:
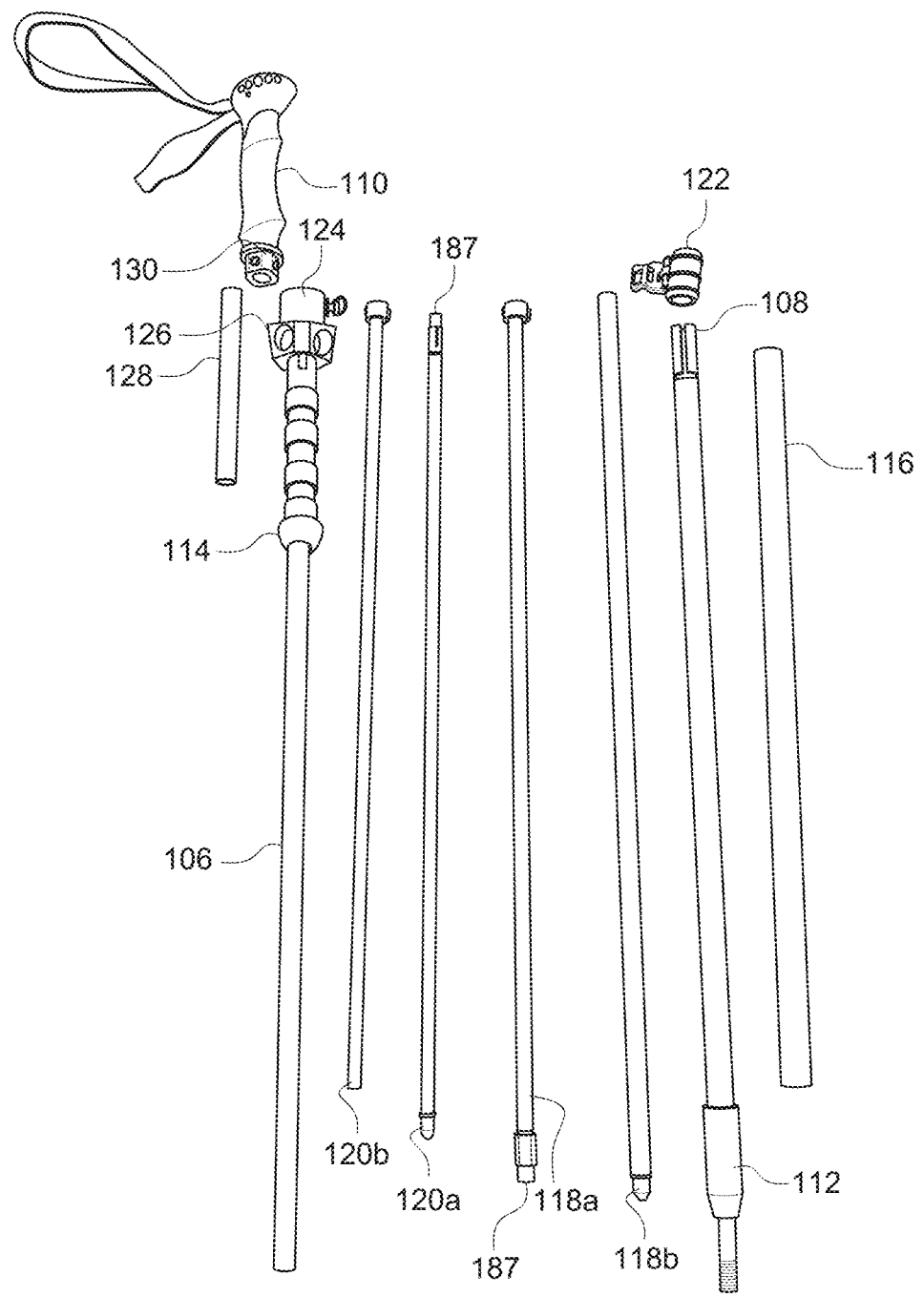
FIG. 2 illustrates components that form an advanced trekking staff according to an example of the principles described herein.

FIG. 2 is an exploded view that illustrates various components that may be used to form an example advanced trekking staff 100 as described herein. The components include a piston 128, D-ring connector 130, handle device 110, housing 124 with the engagement structure 126, grip 114, main shaft 106, locking member 122, tip shaft 108, secondary shaft 116, a first concentric shaft 118*a-b* (e.g., to form a first tripod leg), and a second concentric shaft 120*a-b* (e.g., to form a second tripod leg).

In some examples, each concentric shafts 118*a-b*, 120*a-b* may be formed by two or more nested shafts. For example, the first concentric shaft 118*a-b* includes a first shaft 118*a* that slides within a second shaft 118*b*. A twistable friction mechanism 187 may lock the first shaft 118*a* and second shaft 118*b* in position. Thus, the first concentric shaft 118*a-b* is expandable to a desired length. Similarly, the second concentric shaft 120*a-b* includes a first shaft 120*a* that slides within a second shaft 120*b*. A twistable friction mechanism 187 may lock the first shaft 120*a* and second shaft 120*b* in position, thus providing an adjustable length to the second concentric shaft 120*a-b*. It should be noted that in other embodiments, the concentric shafts may each include a single shaft. In yet other embodiments, the concentric shafts may each include more than two shafts.

Figure 3:
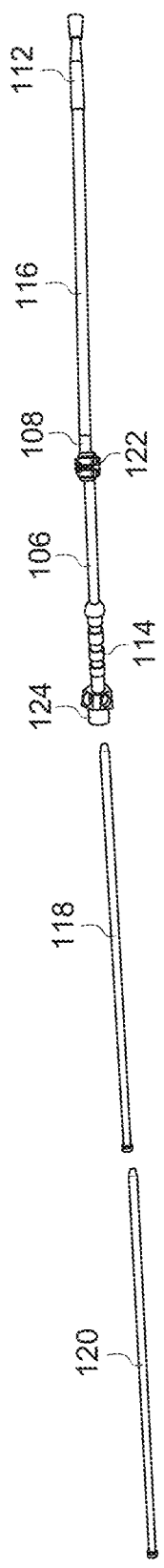
FIG. 3 illustrates an exploded view of concentric shafts and a main shaft of an advanced trekking staff according to an example of the principles described herein.

FIG. 3 illustrates an exploded view of the first concentric shaft 118 and the second concentric shaft 120 of an advanced trekking staff 100 according to an example of the principles described herein. In FIG. 3, the main shaft 106, secondary shaft 116, and tip shaft 108 are assembled. In an example, the first concentric shaft 118 has an interior cavity for receiving the second concentric shaft 120. The interior cavity of the first concentric shaft 118 may extend partly or completely through the interior body of the first concentric shaft 118. The fit may be a friction fit, or slide fit. The interior cavity of the first concentric shaft 118 has at least a depth that allows for a substantial length, or the complete length, of the second concentric shaft 120 to fit therein. In the case of more than two concentric shafts, a telescoping configuration is continued with subsequent concentric shafts being received within interiors of preceding concentric shafts. As described in FIG. 2, the concentric shafts 118, 120 may each include one or more shafts.

In the trekking staff configuration 102, the main shaft 106 contains the first and second concentric shafts 118, 120 within an interior cavity of the main shaft 106. The interior cavity of the main shaft 106 may extend partway or completely through the interior body of the main shaft 106. The interior cavity of the main shaft 106 has at least a depth that allows for a substantial length, or the complete length, of the first and second concentric shafts 118, 120 to fit therein.

On the outside of the main shaft 106 is the tip shaft 108. The main shaft 106 is slidably inserted within the tip shaft 108 to a variably degree. The tip shaft 108 is a shaft that includes the tip 112 at the end of the trekking staff 100 that contacts the ground. The tip shaft 108 attaches to the main shaft 106 at a variable position along the length of the tip shaft 108. The tip shaft 108 may have a friction fit, screw fit, or other fit to maintain the tip shaft 108 coupled within the main shaft 106.

The tip shaft 108 is slidably inserted within the secondary shaft 116. Put another way, the tip shaft 108 is inserted within the opposite end of the secondary shaft 116 relative to the main shaft 106. It should be noted that in some examples the tip 112 at the end of the tip shaft 108 has an end with an outer diameter that is large enough to provide a circumferential lip for circumferential edges at a first end of the secondary shaft 116 to be supported. In other words, the tip 112 may have an end with a diameter larger than the inner diameter of the secondary shaft 116 such that the tip 112 retains the first end of the secondary shaft to the trekking staff in the first configuration (i.e., the trekking staff configuration 102). The secondary shaft 116 is stored in the position on the tip shaft 108 while used in a trekking staff configuration 102. Thus, secondary shaft 116 is a shaft that may be stored concentrically over the tip shaft 108 and main shaft 106. The secondary shaft 116 may be deployed (i.e., removed from the tip shaft 108 and main shaft 106) as a support for a shelter (e.g., a tent) or as a vertical riser to mount camera spotting scope or other optic device.

It should be noted that in some embodiments, the trekking staff 100 may not use the secondary shaft 116. For example, in some embodiments, the trekking staff 100 may not have the secondary shaft 116 attached to the outside of the tip shaft 108. In other embodiments, the secondary shaft 116 may be used for various attachments. For example, the secondary shaft 16 may be used for achieving extra height and for various other applications.

In an example, the tip shaft 108 is longer in length than the secondary shaft 116 such that it protrudes out one or both sides of the secondary shaft 116. The tip shaft 108 has an outer diameter that is larger than the main shaft 106 so that the main shaft 106 slidably fits within the hollow of the tip shaft 108. The locking member 122 may be used to attach the tip shaft 108 to the main shaft 106 with the main shaft 106 positioned at a variable position along the length of the tip shaft 108.

In another example, the tip shaft 108 and main shaft 106 attach to the secondary shaft 116. The attachment for the tip shaft 108 and main shaft 106 may be at a variable position or a fixed position. For example, the secondary shaft 116 may include locking members (e.g., adjustable clamps at either end), each of which releasably couple the tip shaft 108 and main shaft 106 to the secondary shaft 116.

FIG. 4A illustrates an exploded view of the lengthening components, namely, the secondary shaft 116, tip shaft 108, main shaft 106, and locking member 122 of the trekking staff 100. In this example, the locking member 122 is a clamp that may be loosened and tightened around the outer circumference of the main shaft 106 and tip shaft 108. It should be noted that the handle device (FIG. 1, 110) is not shown in FIG. 4A for clarity. An example showing the handle device 110 in an exploded view is provided in FIG. 5.

FIG. 4B illustrates an assembled view of the lengthening components of the trekking staff 100. The trekking staff 100 is not lengthened in this view. The tip shaft 108 slidably fits within the secondary shaft 116 with the tip 112 of the tip shaft 108 with sticking out. The secondary shaft 116 also slides over the main shaft 108 that is coupled with the tip shaft 108. The main shaft 106 is received fully or substantially within the secondary shaft 116. Securement is made possible with the locking member 122 around the main shaft 106 and tip shaft 108 at the position desired.

FIG. 4C illustrates an assembled view of the lengthening components of the convertible trekking staff 100 in an extended configuration. The main shaft 106 is positioned with a substantial portion sticking out of the secondary shaft 116. The secondary shaft 116 is sleeved onto the main shaft 106 and/or the tip shaft 108 and held on by the tip 112 and the locking member 112. The tip shaft 108 is substantially disposed within the secondary shaft 116. Securement is made possible with the locking member 122 around the main shaft 106 and tip shaft 108 at the position desired.

FIG. 4D illustrates the example locking member 122 in an open position while FIG. 4*e* illustrates the example locking member 122 in a closed position. As described above, the locking member 122 affixes the main shaft 106 to the tip shaft 108. The locking member 122 includes a locking arm 138 and circumferential ring 140. The locking arm 138 pivots outward to loosen the circumferential ring 140 and pivots inward to tighten the circumferential ring 140. The locking member 112 may be adjustable for circumferential compression.

Figure 4F:
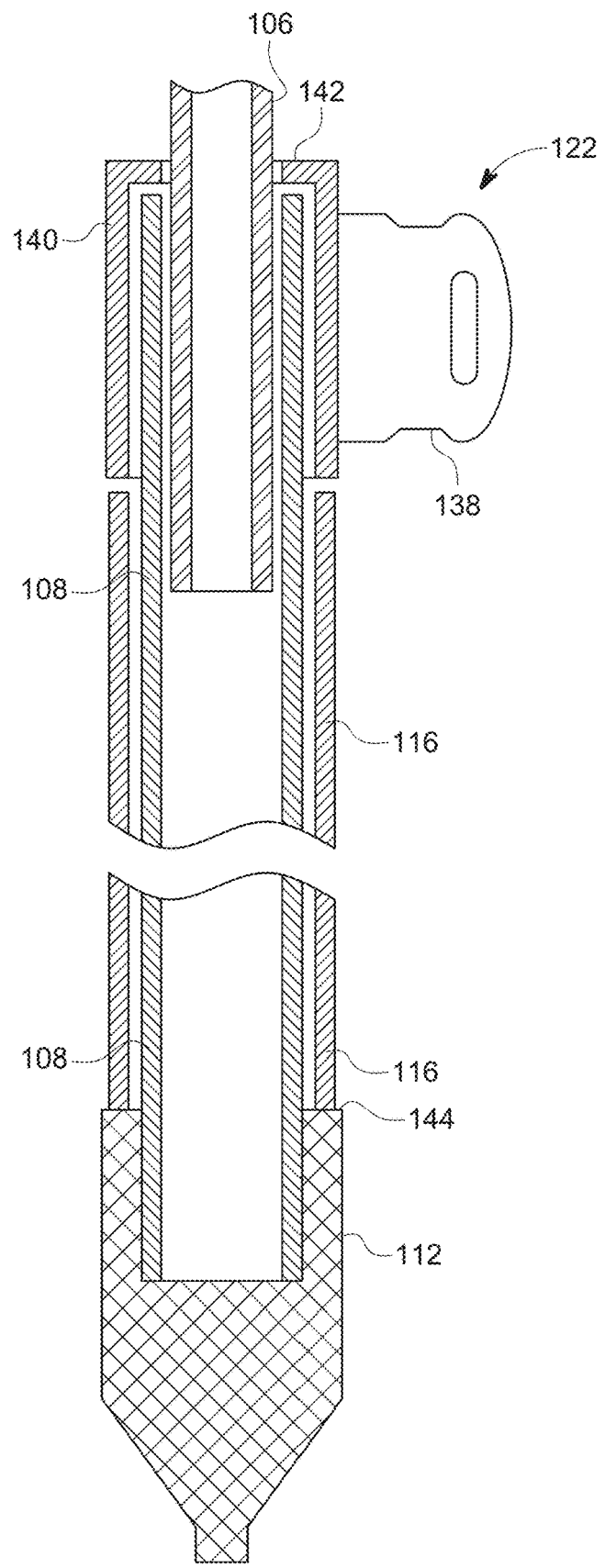
FIG. 4F illustrates a section view of the example locking member in an open position, according to an example of the principles described herein.

FIG. 4F illustrates a section view of the example locking member 122 in an open position. The locking member 122 may also include an inner circumferential lip 142 at a second end of the locking member 122. The inner circumferential lip 142 may rest against the outer surface of the main shaft 106 to prevent the locking member 122 from sliding down the main shaft 106 if the clamp loosens or gets jostled. Furthermore, the tip shaft 108 may be inserted into the opening at the first end of the locking member 122 and the inner circumferential lip 142 may be sized to prevent the tip shaft 108 from extending out of second end of the locking member 122.

As illustrated in FIG. 4F, the secondary shaft 116 may slide on the tip shaft 108 until the first end of secondary shaft 116 contacts an edge 144 on the tip 112 of the tip shaft 108. For assembly, the locking mechanism 122 may be positioned up over the tip shaft 108 before being slid onto the main shaft 106. The locking mechanism 122 may then be slid over the tip shaft 108 to contact the second end of the secondary shaft 116. Thus, the tip 112 of the tip shaft 108 may retain a first end of the secondary shaft 116 while the locking member 122 may retain a second end of the secondary shaft 116 to restrict axial and rotational movement of the secondary shaft 116 along the tip shaft 108. As shown, the outer circumference of the secondary shaft 116 aligns with the outer circumference of the annular shoulder at the end 144 of the tip 112 of the tip shaft 108.

The locking member 122 may be any member that allows the main shaft 106 to lock to more than one position along the length of the tip shaft 108. In addition to a clamp, examples of a locking member 122 include a cam lock, snap lock, friction fit, screw fit, twist lock, spring lock, coupling member, and spring-loaded component. Furthermore, the locking member 122 may be integral with the main shaft 106 or housing 124 such that it is not a removable component.

Figure 5:
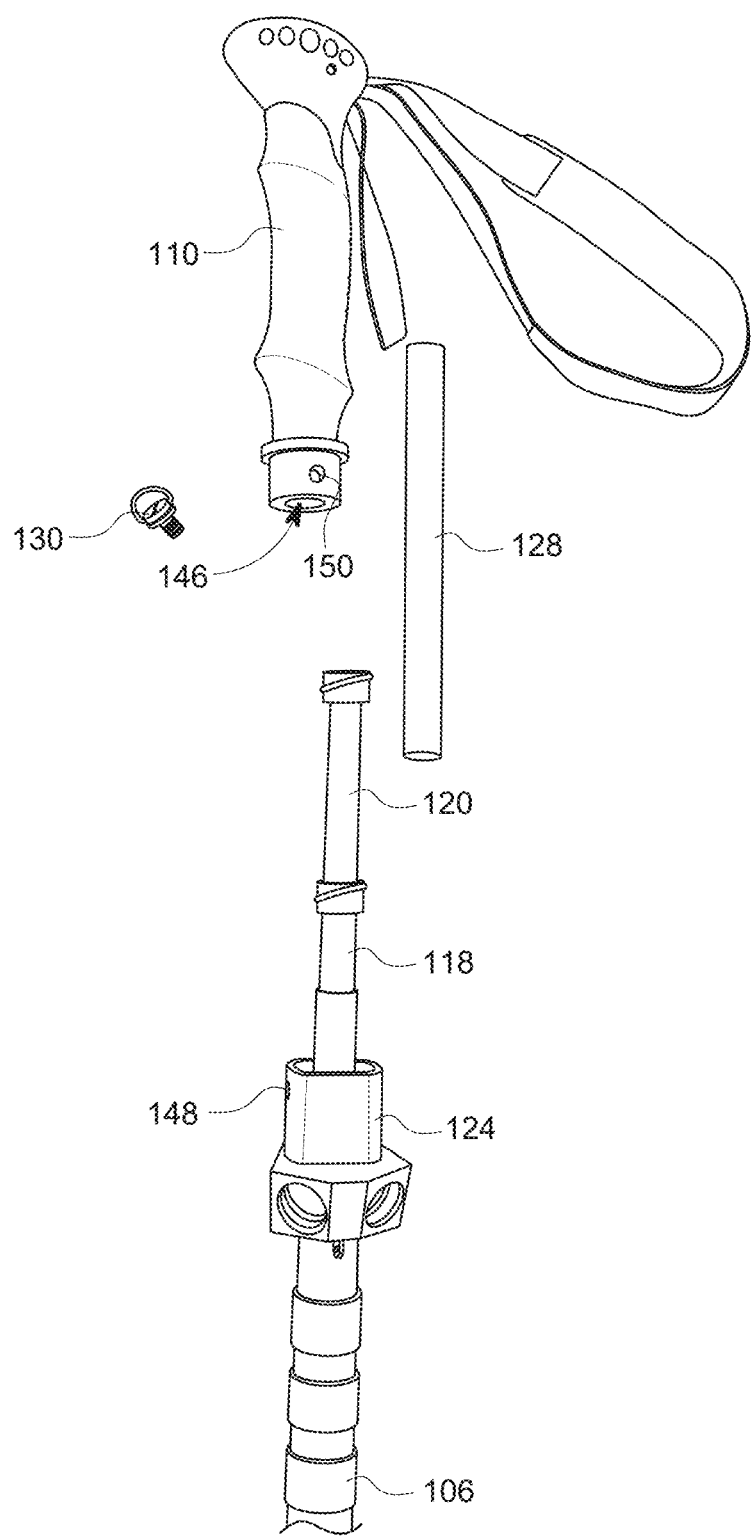
FIG. 5 illustrates components of an advanced trekking staff according to an example of the principles described herein.

FIG. 5 illustrates a handle device 110, piston 128, and main shaft 106. In the view of FIG. 5, the first and second concentric shafts 118, 120 are shown slightly extended from within the main shaft 106 and housing 124 to lend perspective of the assembly. In some examples, the handle device 110 is hollowed and a housing 124 above the main shaft 106 is hollowed. In other examples, the handle device 110 may not be hollow.

In some examples, the handle device 110 includes a handle adapter 146. This may be a piece that fits into a cavity of the housing 124. The handle adapter 146 may interface with other types of function handles for various applications. In some examples, the handle adapter 146 may be longer or shorter based on an application. The handle adapter 146 may also provide tubular for storage in the handle. In some examples, the handle device 110 may also have a tip that can be built for specific applications such as an ice head or digging device.

The handle adapter 146 of the handle device 110 fits within the cavity of the housing 124 and is locked to a lock hole 148 within the housing 124 by a locking structure, such as the D-ring connector 130 as shown. In an example, the D-ring connector 130 may be threaded and received through the lock hole 148 of the housing 124 and threaded to a corresponding threaded hole 150 on the end 146 of the handle device 110. As shown, the lock hole 148 is located on a side of the housing 124. In an example, the top of the handle device 110 is threaded to allow items to be attached to the top of the handle 110. It should be noted that in other implementations, a pin or other non-threaded faster may be used to attach the handle device 110 to the housing 124.

The piston 128 is an elongate member with shock-resistant properties or other qualities that provide compression. For example, the piston 128 may be formed of an elastically deformable material. During use, small items may be placed within the hollow of the handle device 110 and the piston 128 is then inserted within the handle for a fit that maintains the small items such that the small items do not move within the handle device 110. The items are thus cushioned and may be slightly compressed within the handle device 110. Thus, the items are prevented from being jostled within the handle device 110. Other properties of the piston 128 may include being spring-like or otherwise being capable of resuming an original shape after compression.

In an example, the piston 128 may be lengthened or shortened. In one example, the piston 128 may be made of foam or other material that can be cut to be shortened. In another example, the piston 128 may be made of multiple pieces, each of which is removably attached so that the piston 128 can be lengthened or shortened, and otherwise changed in length as desired. This allows various sized items to be placed and stored within the handle as desired.

In some embodiments, multiple different handle devices 110 may be interchangeably attached to the housing 124. In this case, the housing 124 is configured to receive different handle devices 110 that each have a different use. In some embodiments, one handle device 110 is tipped for holding items (e.g., a camera, optics platform, rifle mount, etc.) and a different handle device 110 includes a mechanism (e.g., an ice axe) for gaining purchase on steep terrain. The different handle devices 110 may be interchanged to attach to the housing 124 based on a given use case.

Figure 6A:
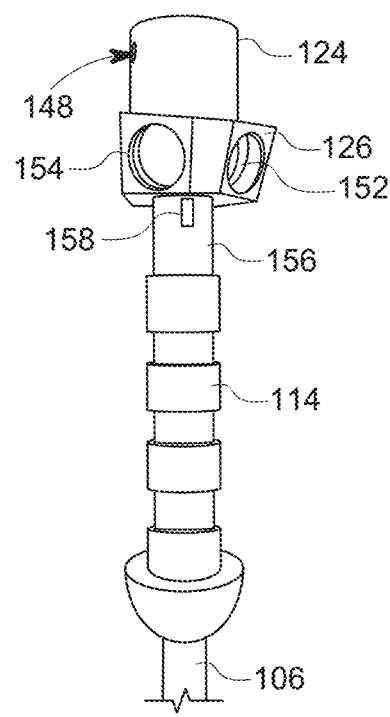
FIG. 6A illustrates components of an advanced trekking staff according to an example of the principles described herein.

Turning to FIG. 6A, receiver holes 152, 154 of the engagement structure 126 of the housing 124 are shown, which receiver holes 152, 154 are to receive the first and second concentric shafts 118, 120, respectively. A first receiver hole 152 may receive the first concentric shaft 118 and a second receiver hole 154 may receive the second concentric shaft 120. The receiver holes 152, 154 are threaded to provide a secure fit and proper angle of the first and second concentric shafts 118, 120, which are also threaded, with the housing 124.

The housing 124 may be a separate unit that is attached to the main shaft 106 or may be part of the main shaft 106. As depicted in FIG. 6A, the housing 124 is attached to the main shaft 106. For example, the housing 124 includes a hollow sleeve 156 adjacent to the engagement structure 126. The hollow sleeve 156 receives the main shaft 106. The remainder of the main shaft 106 may have a smaller diameter than the hollow sleeve 156 for a sleeker device.

In some examples, the housing 124 includes a tie down hole 158. The tie down hole 158 may be located below the receiver holes 152, 154 and is used to insert a tether or cord to tie down the trekking staff 100 when it is in a tripod configuration. Also shown in FIG. 6A is a grip 114 below the housing 126, which includes a material to facilitate a user to grasping the trekking staff 100 when the travel terrain changes for instant adjustment for comfort and security while walking.

Figure 6B:
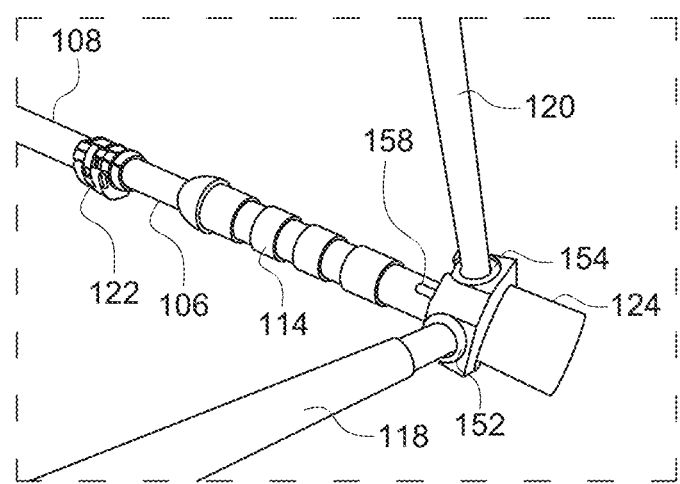
FIG. 6B illustrates a locked configuration of the concentric shafts on a tripod configuration according to an example of the principles described herein.

FIG. 6B illustrates a locked configuration of the concentric shafts 118, 120 in a tripod configuration according to an example of the principles described herein. Particularly, the first and second concentric shafts 118, 120 are attached (e.g., screwed) to the housing 124. In some examples, the receiver holes 152, 154 are angled outward and downward relative to a central axis of the main shaft 106. Therefore, the first and second concentric shafts 118, 120 may be angled outward and downward relative to the main shaft 106 to form a stable tripod configuration. In some examples, shafts 118 and 120 may attach to the housing 124 with a connection mechanism. Some examples of the connection mechanism include a threaded fastener, twist-lock compression lock, compression fit, slip fit, or other structure that allows for assembly and disassembly of the shafts 118 and 120 to the housing 124. In an example, the ends of the shafts 118, 120 include threads to screw into corresponding threads in the receiver holes 152, 154 of the housing 124. In another example, the holes 152, 154 may provide a compression fit to grip the ends of the shafts 118, 120.

Figure 7:
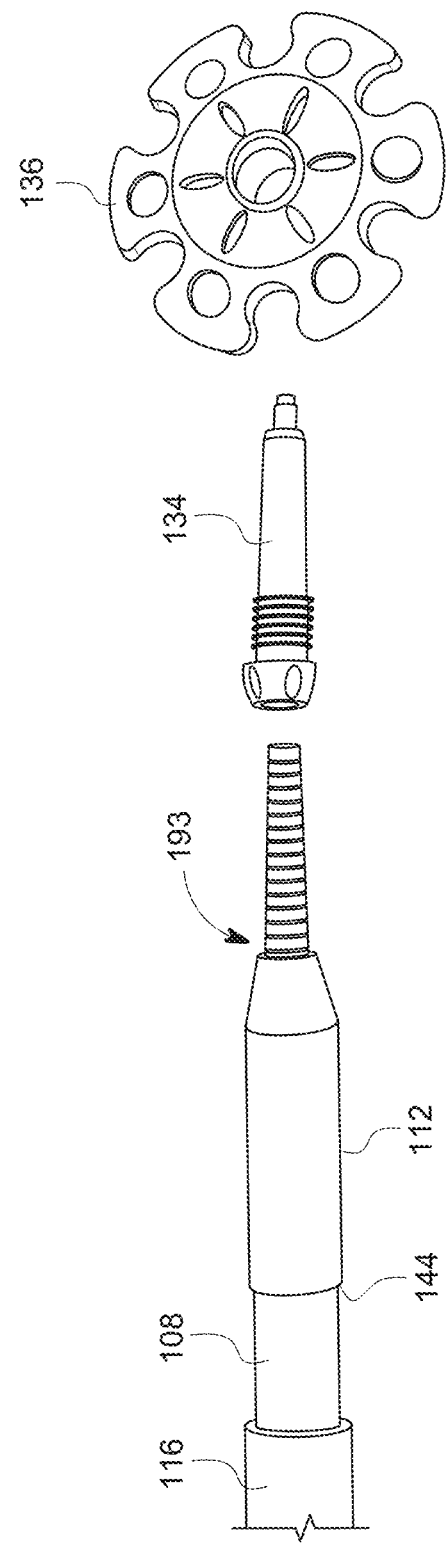
FIG. 7 illustrates components of an advanced trekking staff according to an example of the principles described herein.

FIG. 7 illustrates a tip shaft 108 with a tip 112 at the end of the tip shaft 108. In some examples, the tip 112 is a metal material, though other materials (e.g., plastic, elastomer, wood, etc.) may be used for the tip 112. The tip shaft 108 is attached to or formed with the tip 112. The tip 112 includes an end 144 with an outer circumference that forms an annular shoulder that supports the bottom circumference of the secondary shaft 116 (not shown), which may be slid onto the tip shaft 108.

In some examples, the tip 112 is used to attach other accessories for function and may be threaded, grooved or friction fit. Such accessories may include fish gaff spear, fishing rod guide, an oaring paddle, or stand platform (not shown).

Various components may be attached to the tip 112 of the tip shaft 108. An example tip sleeve 134 and snow basket 136 shown may be attached, for example. The various components provide support for various terrains and conditions. The tip sleeve 134 provides for a stable entrenchment with the ground, with a sharper tip for rocky terrain while the snow basket 136 provides a larger footing area on the ground for snow terrain. In an example, the tip shaft 108 is also removably attached to the main shaft 106 such that various implementations of the tip shaft 108 may be attached.

In some embodiments, the tip 112 may also include threads 193 to support a stable locking mechanism for attachments to the tip 112. For example, a paddle end may be securely threaded to the threads 193 of the tip 112 to convert the trekking staff 100 into a paddle. In another example, a fishing rod guide may be threaded onto the threads 193 to convert the trekking staff 100 into a fishing pole. In yet another example, a fishing spear head may be attached to the threads 193 of the tip 112. Thus, the tip 112 may be an interface for attaching additional attachments to the trekking staff 100. It should be noted that different types of fixation methods may be included on the tip 112 to secure attachments. For example, the tip 112 may include a threaded friction mechanism, a groove spring lock, a twist lock, etc. Thus, the tip 112 provides a connection interface (e.g., threads 193) for different attachments that are removable from the tip shaft 108. The tip 112 may also include grooves (not shown) or other structures to secure attachments to the tip 112.

Figure 8A:
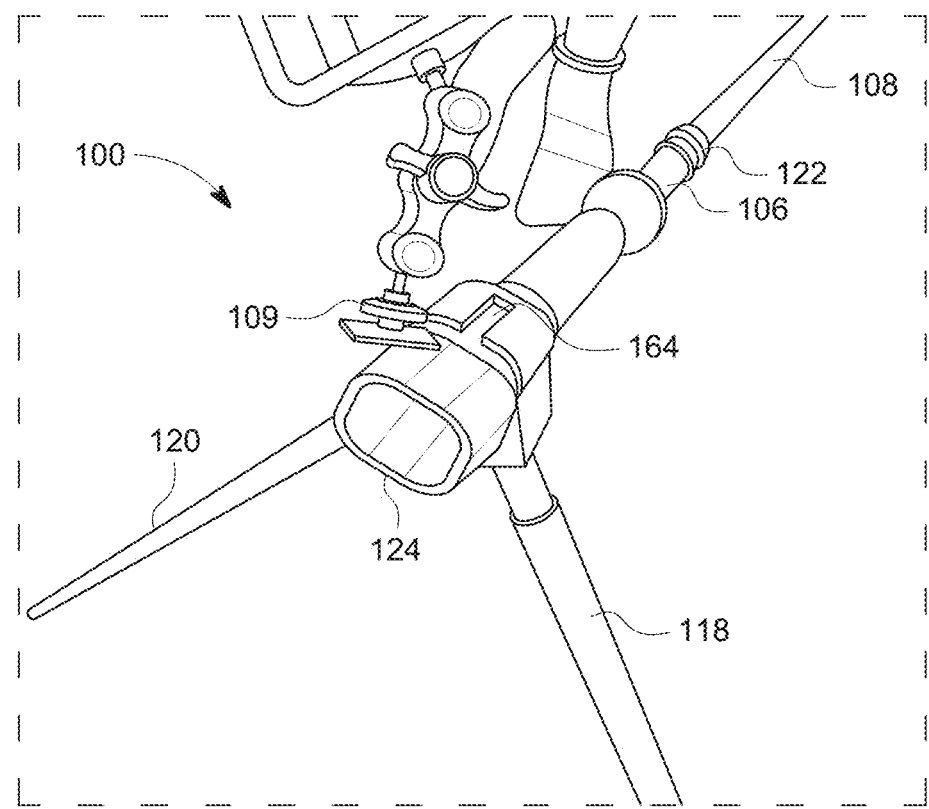
FIG. 8A illustrates a T-slot on an advanced trekking staff according to an example of the principles described herein.
Figure 8B:
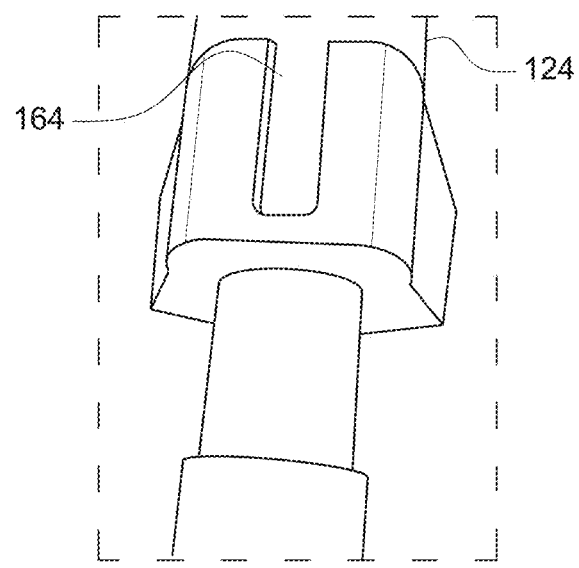
FIG. 8B illustrates a T-slot on an advanced trekking staff according to an example of the principles described herein.

FIG. 8A illustrates a T-slot 164 on a trekking staff 100 according to an example of the principles described herein. FIG. 8B provides a close-up view of the T-slot 164. The T-slot 164 is located on the housing 124 attached to the main shaft 106. The T-slot 164 may coupled to an adapter 109 to be slidably inserted and held in place to the housing 124. The adapter 109 may support a component such as a camera, scope, or other object.

In an example, the T-slot 164 is formed on the housing 124. Specifically, as depicted the T-slot 164 is formed on the housing 124 on an opposite surface from the receiver holes 152, 154 that receive the concentric shafts 118, 120. The T-slot 164 prevents sliding and rotation of the adapter 109 along the main shaft 106. Various items may be connected to the adapters 109, which are attached to the T-slot 164. The adapter 109 shown in FIG. 8A includes a support for a camera, a camp light, a tether spot for a tent, or other devices. The adapter 109 may have parts that can be adjusted and that can be moved relative to the T-slot 164, with the T-slot 164 anchoring the bottom of the adapter 109 in place relative to the main shaft 106. This allows the tripod configuration to be maintained in a fixed position while the adapter 109 is adjusted. This also stabilizes the adapter 109 in an environment despite wind, rain, or jostling movement that would otherwise make the adapter 109 fall off the main shaft 106.

The position of the T-slot 164 may be anywhere along the main shaft 106 or the housing 124. In some examples, an accessory 109 may slide through and bottom out in the T-slot 164 as shown. In other examples, the T-slot 164 may be threaded or attached via other mechanisms to the housing 124. As shown, the T-slot 164 is positioned on an opposite side of the receiver holes 152, 154, however, other positions are anticipated.

Figure 9:
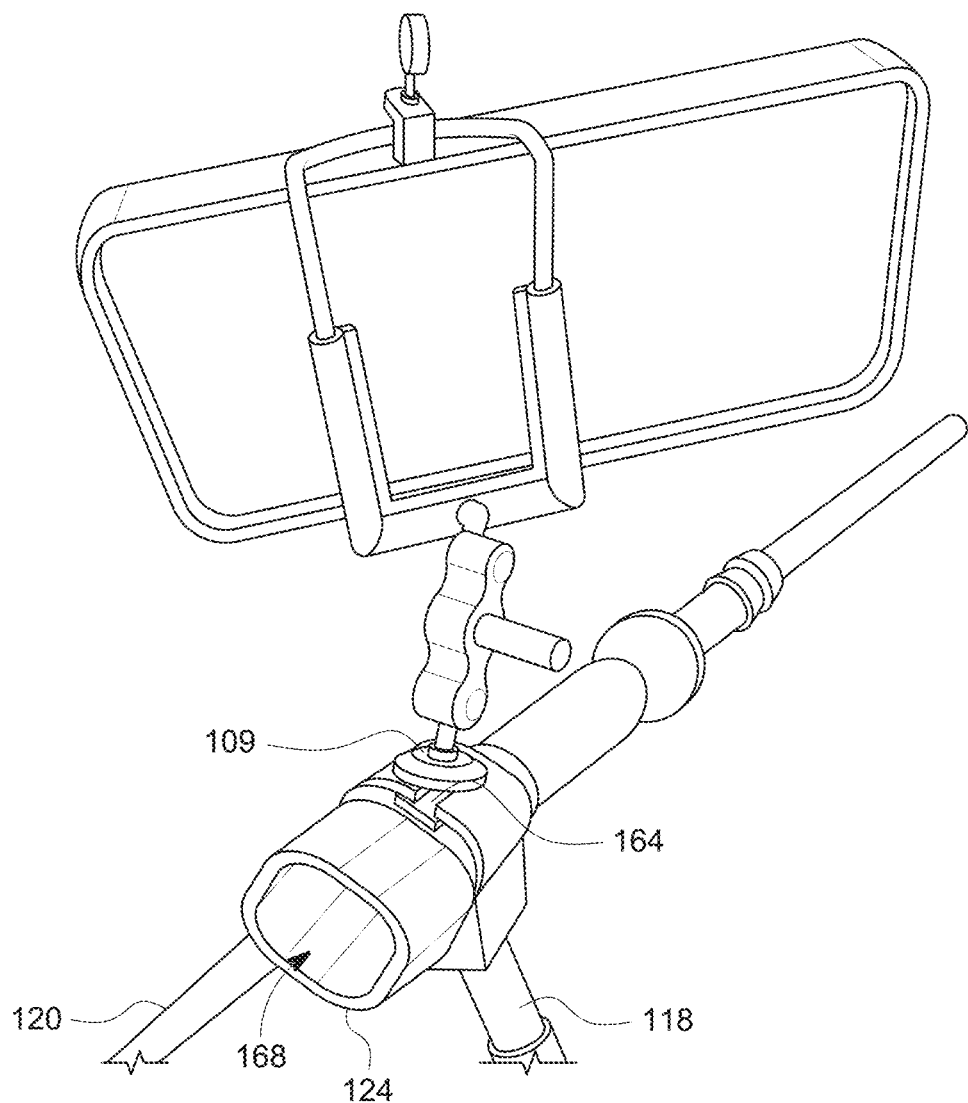
FIG. 9 illustrates an adapter attached on a T-slot on an advanced trekking staff according to an example of the principles described herein.

FIG. 9 illustrates an adapter 109 attached on a T-slot 164 on a convertible trekking staff 100 according to an example of the principles described herein. As described above, the adapter 109 may be used to hold a camera, mounting platform, or other external component.

Also visible in FIG. 9 is a cavity 168 of the housing 124 of the main shaft 106 that is exposed when the handle device 110 is removed from the top of the housing 124. The concentric shafts 120 may be inserted into the cavity 168 when the trekking staff 100 is in the trekking staff configuration.

In an example, an external component (not shown) may be attached to the housing 124 via the cavity 168. For example, an external component may include an end that is inserted within the cavity 168 of the housing 124. The exposed portion of the external component may include structure for holding an object (not shown). Objects may include such things as a camera, or other devices or objects attached to the main shaft 106. In another example, the objects themselves are attached directly to the cavity 168 of the housing 124. An example of the external component is the mounting platform (FIG. 2, 132).

Figure 10:
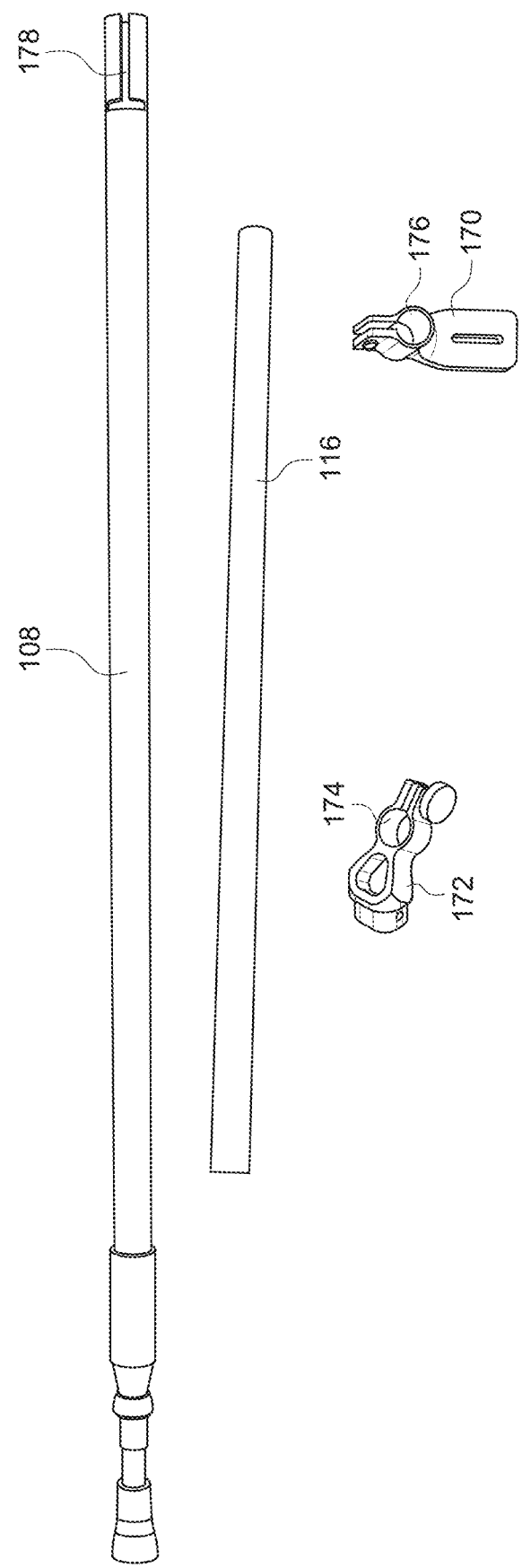
FIG. 10 illustrates components for the tripod configuration according to an example of the principles described herein.
Figure 11:
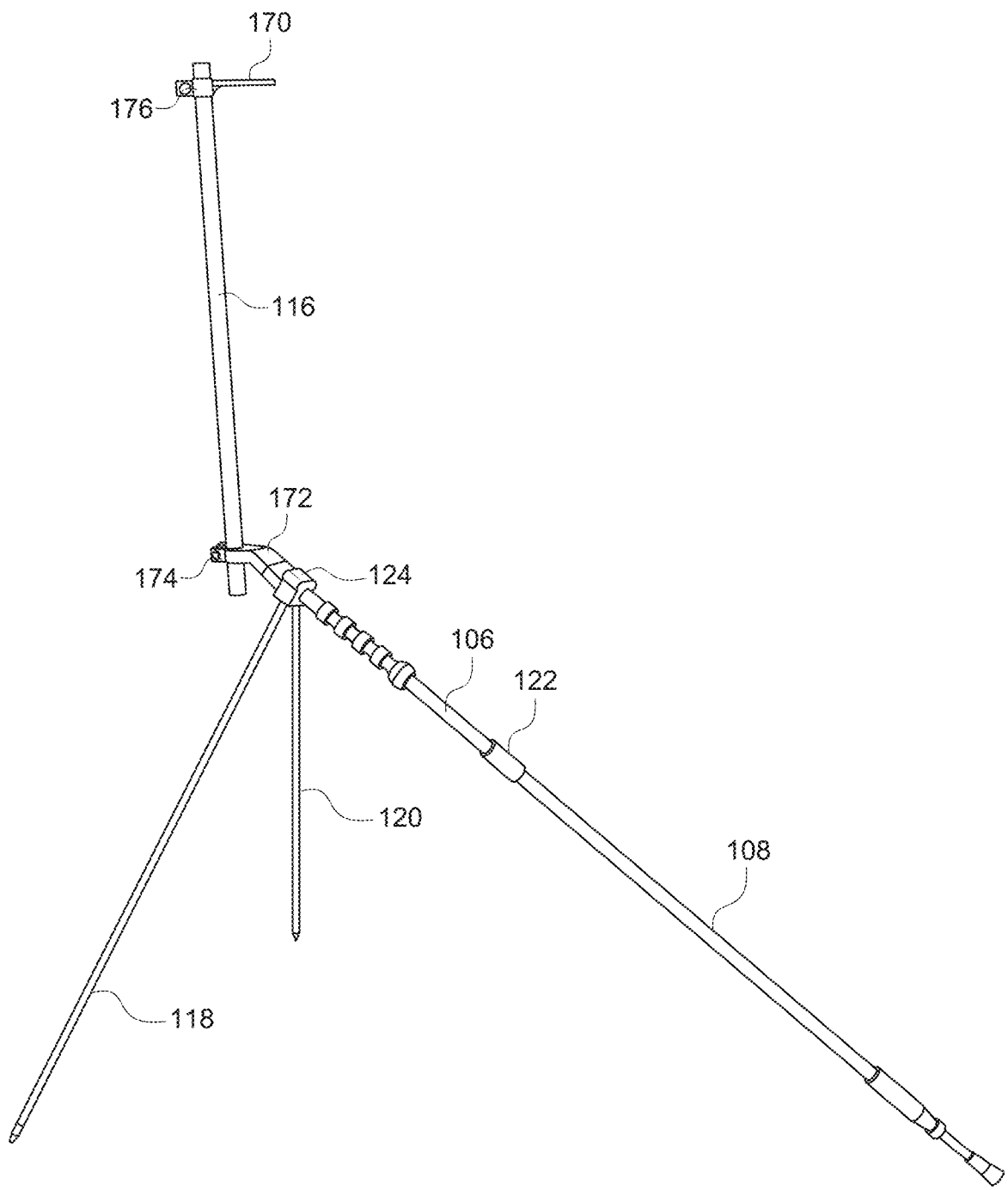
FIG. 11 illustrates the tripod configuration according to an example of the principles described herein.

FIG. 10 illustrates the tip shaft 108, secondary shaft 116, mounting platform 170, and holder 172. The secondary shaft 116 may be slid over the tip shaft 108 (the tip shaft 108 being inserted within the secondary shaft 116) during use, as stated previously. The secondary shaft 116 is removed when the tripod configuration is formed. Additionally, when the handle device 110 is removed from the cavity 168 of the housing 124 of the main shaft 106, the holder 172 may be inserted into the cavity 168 of the housing 124. Like the handle device 110, the holder 172 includes an insert on one side that is inserted within the cavity 168 of the housing 124. On the opposite side, the holder 172 includes a ring 172 through which the secondary shaft 116 may be inserted and secured. The secondary shaft 116 may be held, for example, in a vertical position as shown in FIG. 11. As such, the secondary shaft 116 provides an additional height on which various structures and securements may be coupled to the tripod. FIG. 10 also depicts a mounting platform 176 that may include a platform and a ring 176 that may be attached to the secondary shaft 116 at a variable location. As shown, the mounting platform 132 is attached at the top of the secondary shaft 116. In an example, the mounting platform 132 includes a ledge to support devices. In an example, the mounting platform 132 is adjustable so that it may be angled relative to the ring.

Also in FIG. 10, note that the tip shaft 108 includes an inverted T-slot 178 at its top. This allows top side portions of the tip shaft 108 to be squeezed together when the locking member 122 is being placed on the overlapping portions of the tip shaft 108 and main shaft 106 for securing them together at a variable position.

FIG. 11 provides an example in which the holder 172 is inserted into the interior of the housing 124. The secondary shaft 116 is secured to the ring 174 of the holder. At the top of the secondary shaft 116, the mounting platform 170 is attached. In this manner, the mounting platform 170 is raised to a height above the tripod.

FIGS. 12A-12E illustrate views of the housing 124 for the trekking staff 100, according to an example. As described herein, the housing 124 includes an engagement structure 152 with threaded receiver holes 152, 154. A first receiver hole 152 receives the threaded end of the first concentric shaft 118. The second receiver hole 154 receives the threaded end of the second concentric shaft 120. In some examples, there is no specific receiver hole for a specific shaft. In other words, the shafts 118, 120 may be interchangeably inserted into either receiver hole 152, 154.

In some examples, the housing 124 includes a tie down hole 158. The tie down hole 158 may be located below the receiver holes 152, 154. The tie down hole 158 may be used to insert a tether or cord to tie down the trekking staff 100 when it is in a tripod configuration.

The housing 124 includes a receiver structure 188 to receive corresponding insert structures. For example, the handle device 110 (not shown) may include an insert structure that is inserted into the receiver structure 188. The receiver structure 188 may include a lock hole 148 to receive a connector (e.g., D-ring connector 130). In some examples, the housing 124 may be threaded to retain the D-ring connector 130 to prevent loss of the D-ring connector 130 while still allowing the handle device 110 to be removed easily. In some examples, the handle device 110 may is grooved and may include an O-ring to improve the fit between the handle device 110 and the receiver structure 188.

Figure 13:
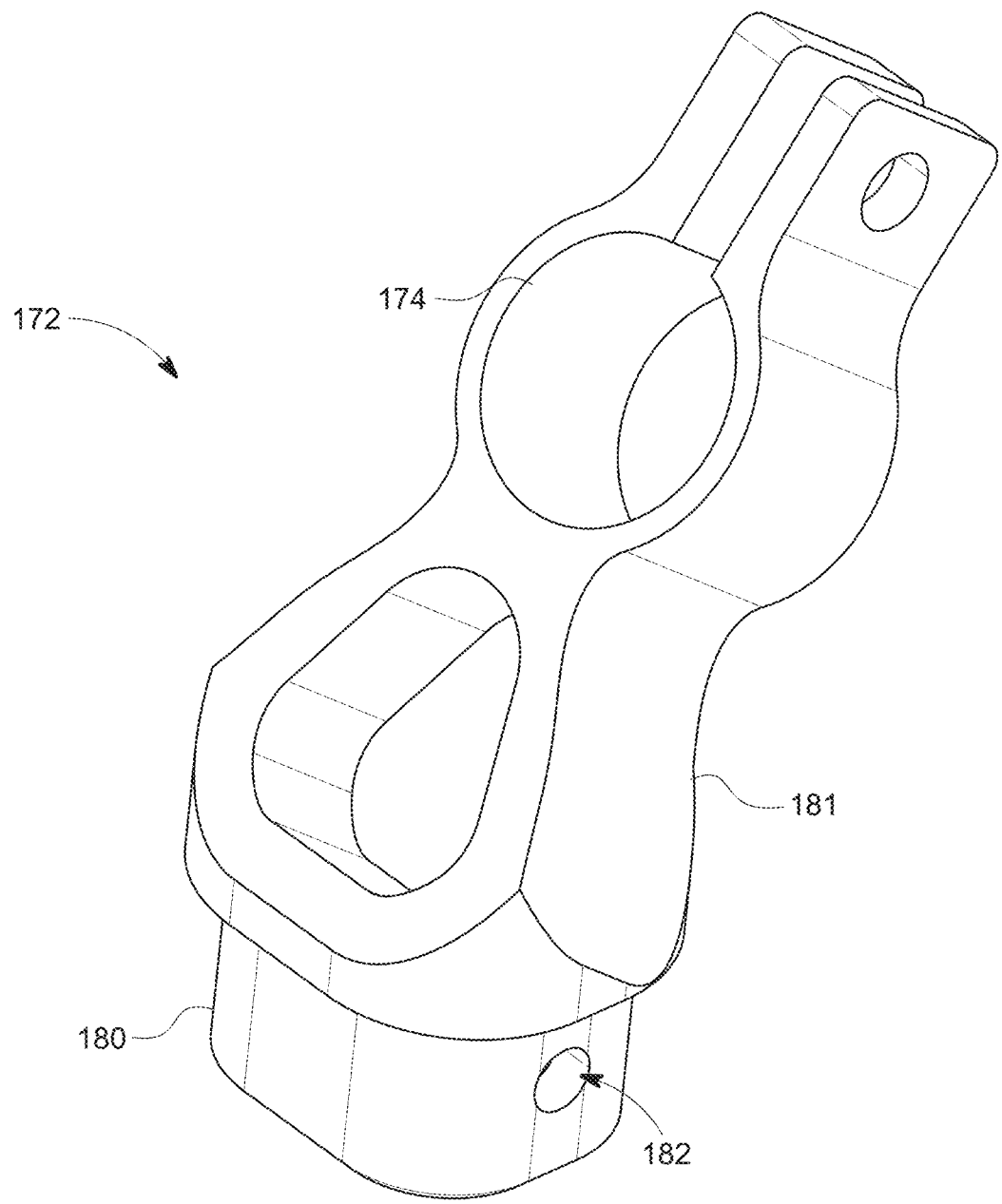
FIG. 13 illustrates a holder for the trekking staff according to an example of the principles described herein.

The receiver structure 188 may form a cavity 168 to receive an insert structure (e.g., FIG. 13, 180). A hole 190 may be formed through the entire housing 124 to allow the concentric shafts 118, 120 to pass through the housing 124. In some examples, the housing includes a lip 192 at a bottom surface of the cavity 168. The lip 192 may engage the threaded head of the first concentric shaft 118 to prevent the first concentric shaft 118 from passing through the hole 190.

The housing 124 includes a hollow sleeve 156 to receive and couple to the main shaft 106 (not shown). For example, the main shaft 106 may be inserted into the hollow sleeve 156 and attached (e.g., glued, welded, threaded, etc.) to the hollow sleeve 156.

The housing 124 also includes a T-slot 164 to facilitate coupling to an adapter. The T-slot 164 may be positioned on the housing 124 such that the adapter faces upward when the trekking staff 100 is in a tripod configuration.

Figure 12A:
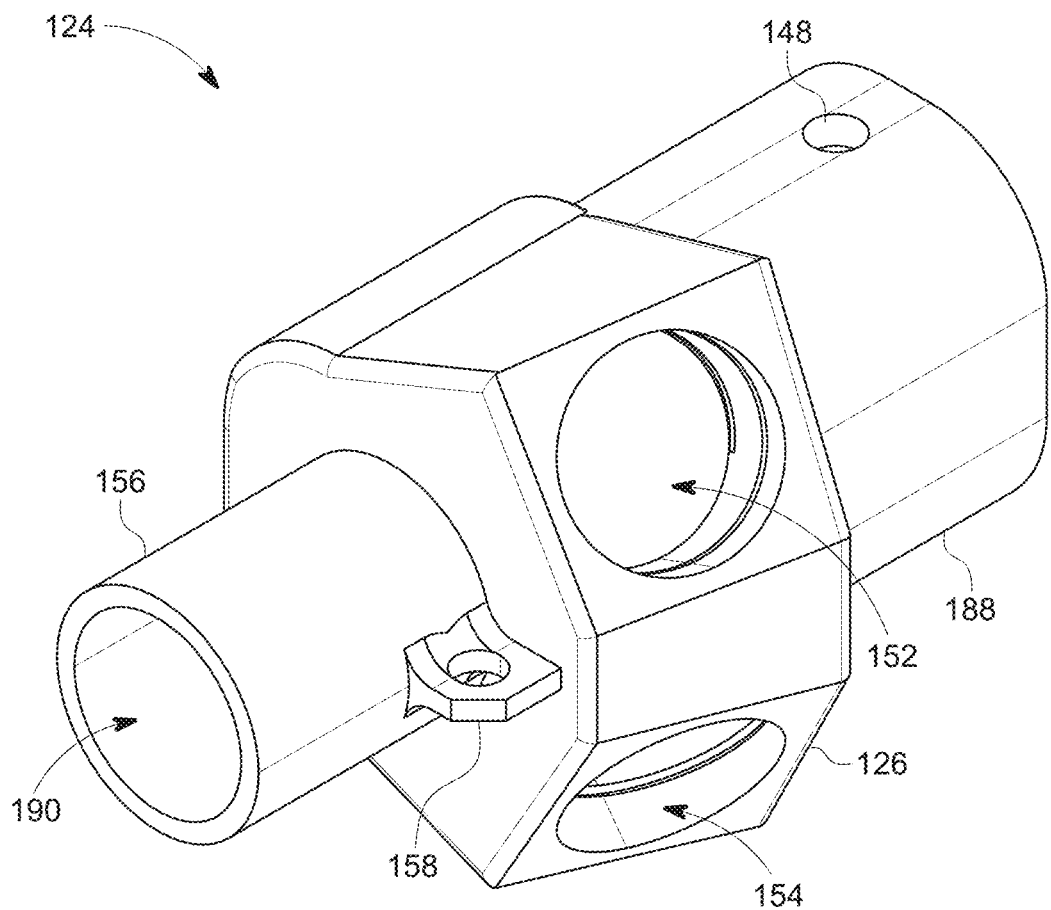
FIGS. 12A-12C illustrate views of the housing for the trekking staff, according to an example of the principles described herein.
Figure 12B:
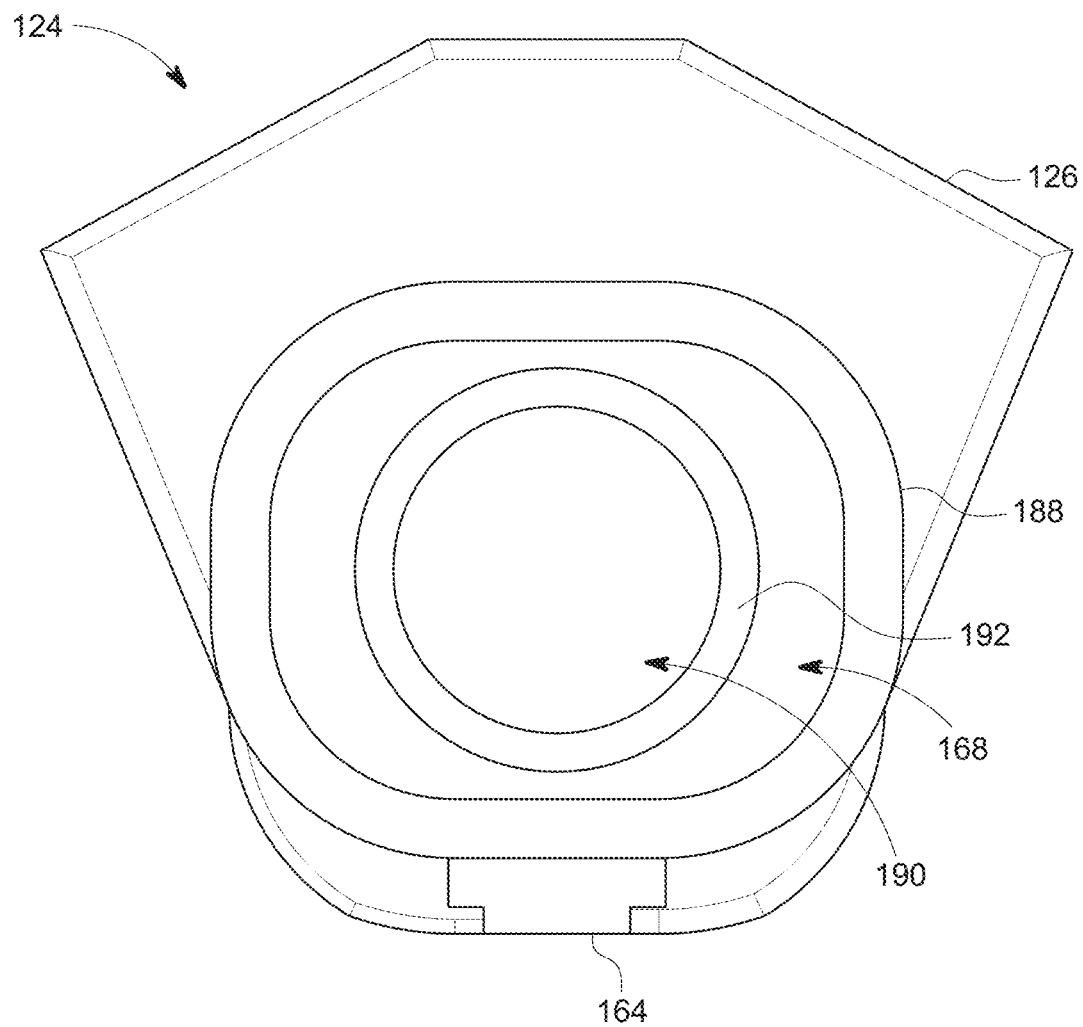
Figure 12C:
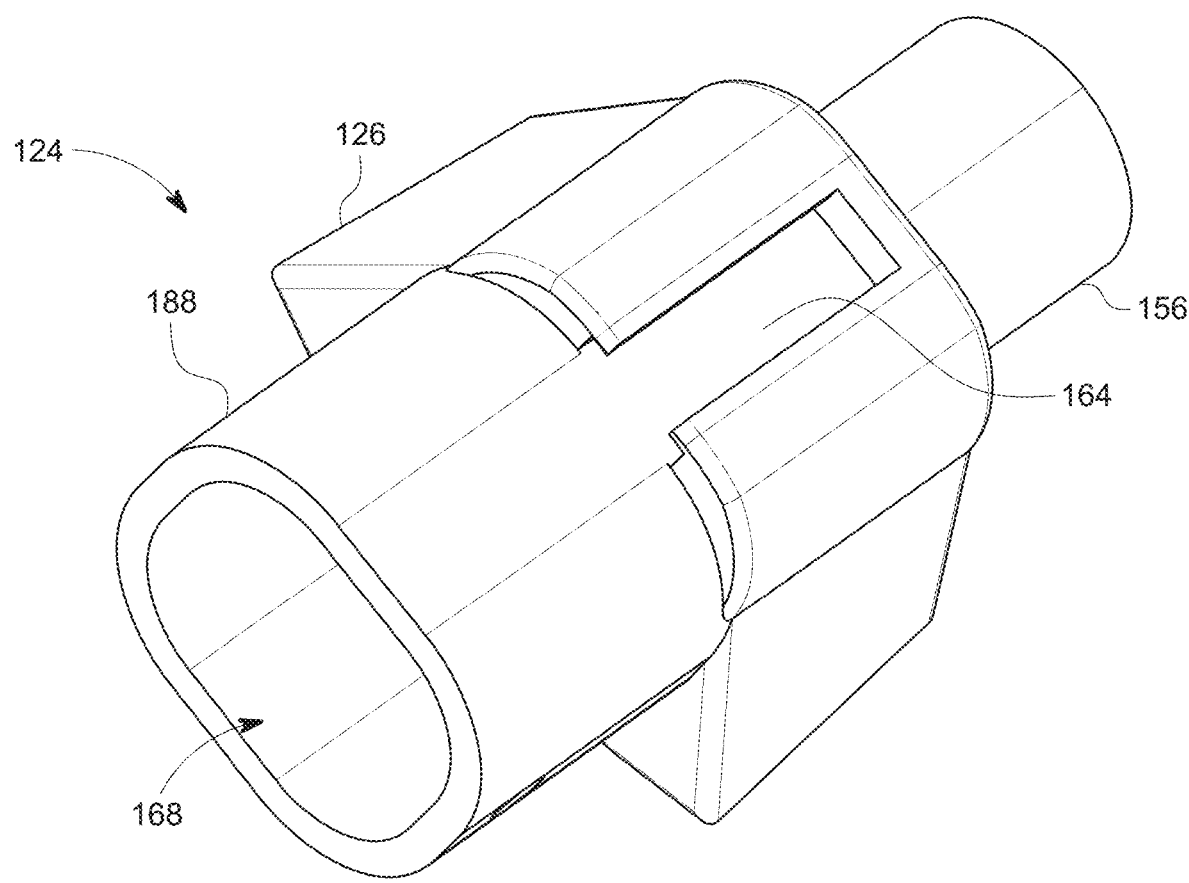
Figure 12D:
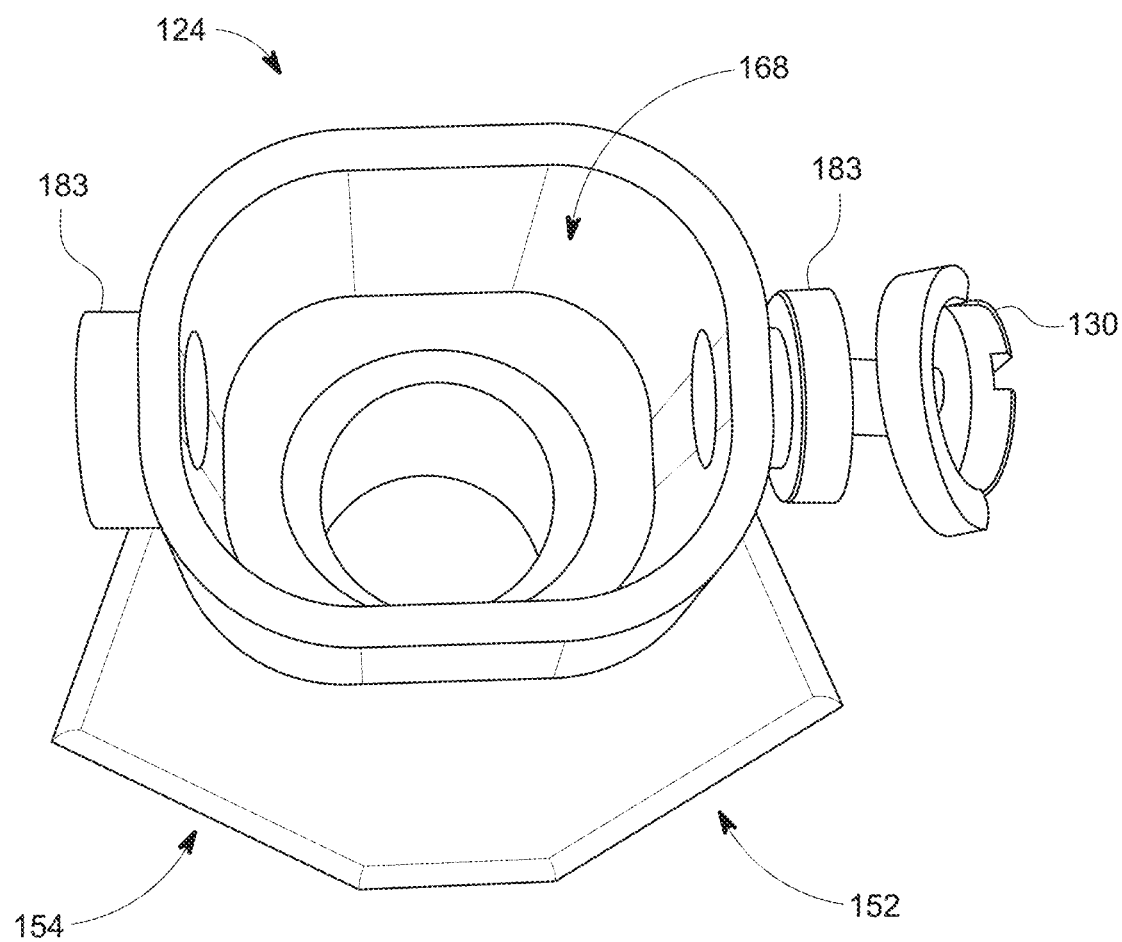
FIGS. 12D-12E illustrate the housing with a D-ring stay to retain the D-ring connector when removing an attachment from the cavity of the housing.
Figure 12E:
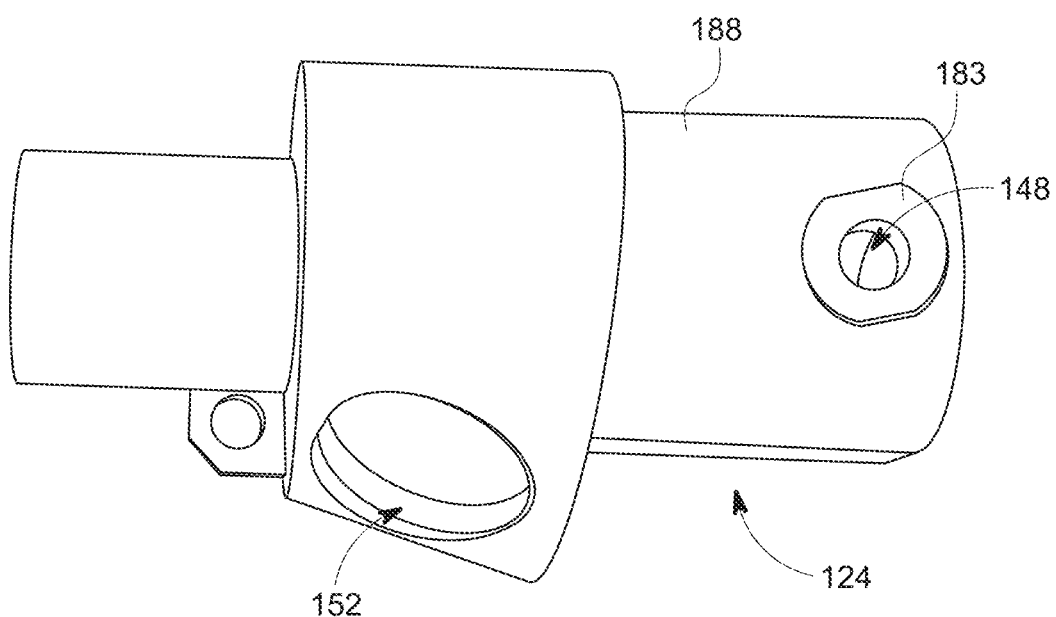

FIGS. 12D-12E illustrate the housing 124 with a D-ring stay 183 to retain the D-ring connector 130 when removing an attachment (e.g., handle device 110) from the cavity 168 of the housing 124. The D-ring stay 183 may project from the outer wall of the receiver structure 188. The D-ring stay 183 may include threads that interface with threads on the D-ring connector 130. When an attachment (e.g., handle device 110) is connected to the housing 124, the threads of the D-ring connector 130 may engage threads of the attachment. As the D-ring connector 130 is retracted from the attachment, the threads of the D-ring connector 130 may engage the threads of the D-ring stay 183. The attachment can be removed from the housing 124 while the D-ring connector 130 remains engaged with the D-ring stay 183, thus avoiding the D-ring connector 130 from becoming lost.

In some examples, the housing 124 includes two or more D-ring stays 183 located on different sides of the receiver structure 188.

FIG. 13 illustrates a holder 172 for the trekking staff 100 according to an example of the principles described herein. The holder 172 includes an insert structure 108. In some examples, the insert structure 180 may be configured to insert into a receiver structure (FIGS. 12a-c, 188) of a housing 124. The insert structure 180 includes a hole 182 to receive a connector. For example, the hole 182 may be threaded to receive a threaded D-ring connector 130, or unthreaded to receive a pin. In some examples, the holder 172 may include multiple holes to allow a connector to pass through insert structure 180.

The holder 172 includes a ring 174 to receive the secondary shaft 116 (not shown). For example, when the trekking staff 100 is in the tripod configuration, the secondary shaft 116 may be inserted into the ring 174 to form a vertical support structure. This may be accomplished as described in FIG. 11.

The holder 172 may include a main body 181 connected to the insert structure 180. In some examples, the main body 181 may be attached to the insert structure 180 at an angle to allow the ring 174 to support the secondary shaft 116 in an approximately vertical orientation.

Figure 14:
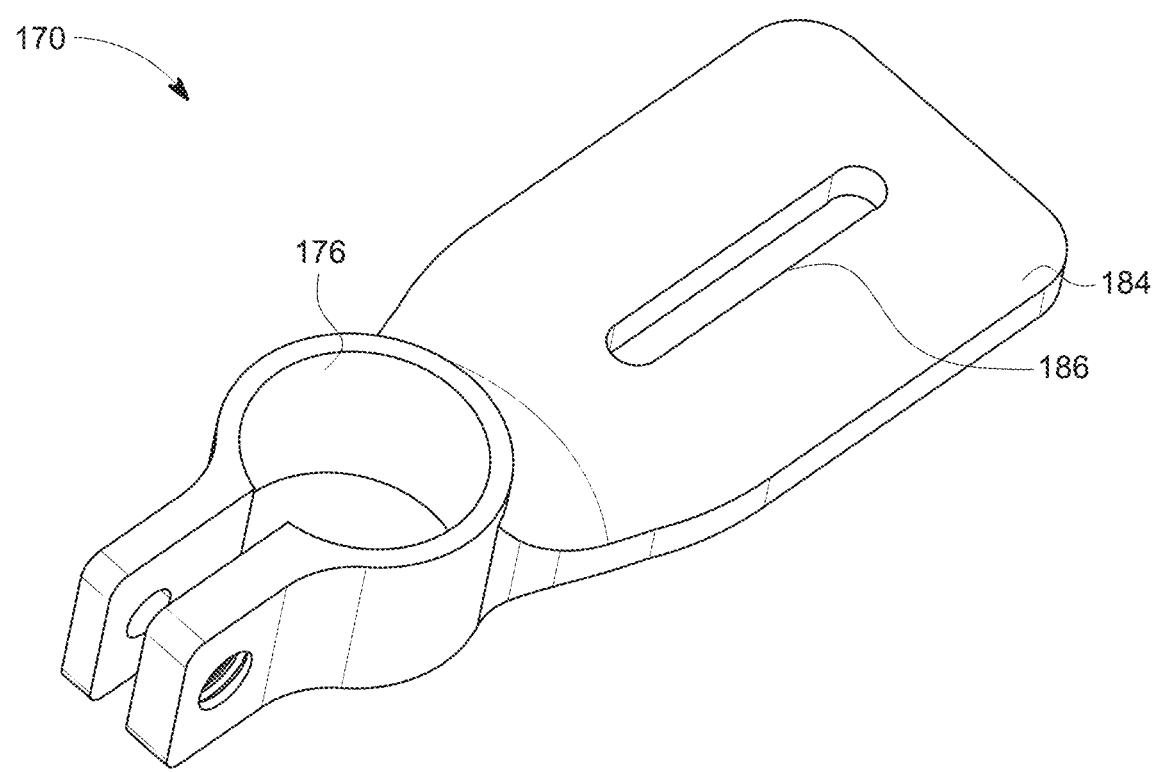
FIG. 14 illustrates a mounting platform to attach to the secondary shaft according to an example of the principles described herein.

FIG. 14 illustrates a mounting platform 170 to attach to the secondary shaft 116 according to an example of the principles described herein. The mounting platform 170 includes a ring 176 to receive the secondary shaft 116. For example, when the trekking staff 100 is in the tripod configuration, the secondary shaft 116 may be inserted into the ring 176. This may be accomplished as described in FIG. 11.

The mounting platform 170 includes a mounting surface 184 coupled to the ring 176. The mounting surface 184 provides a surface to attach an object (e.g., a camera). The mounting surface 184 includes a slot 186 to receive a fastener for mounting the object to the mounting surface 184.

Further examples of the trekking staff 100 include multiple secondary shafts being in concentric form so that they can fit over the tip shaft 108 in the trekking staff (i.e., first) configuration. For example, the multiple secondary shafts may be nested within each other and slid on the tip shaft 108 for storage during travel. Once removed, the multiple concentric secondary shafts may be used for various structures, including, for example, scaffolding for a tent, a holder structure for an artist's easel, a relatively tall, vertical platform for optics, various camera setups, and other structures that include tripod setups or connective setups. In some examples, the multiple secondary shafts may be used as scaffolding for a hunting blind or any shelter using either a pyramid formation formed by the concentric shafts 118, 120 or any kind of alternate formation of the concentric shafts 118, 120, the tip shaft 116, the main shaft 106 and/or any secondary shaft 116.

Figure 15A:
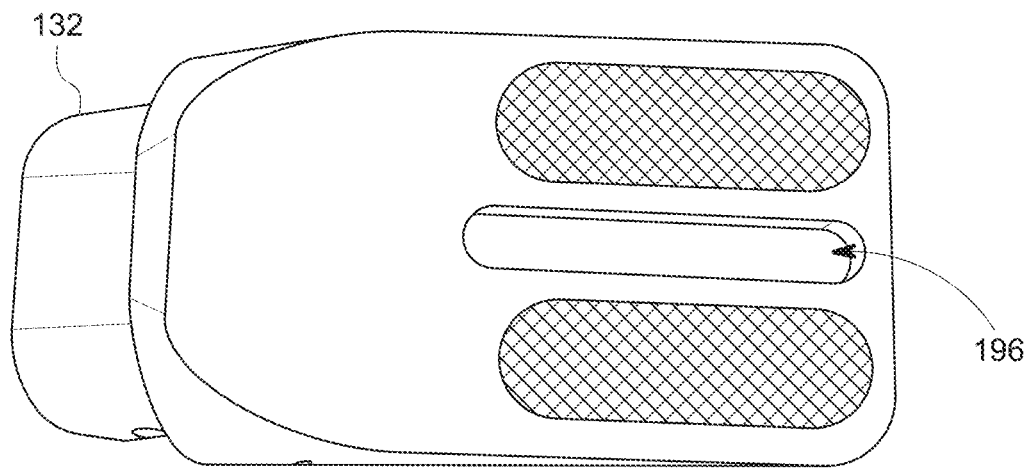
FIGS. 15A-15B illustrate a mounting platform according to another example.
Figure 15B:
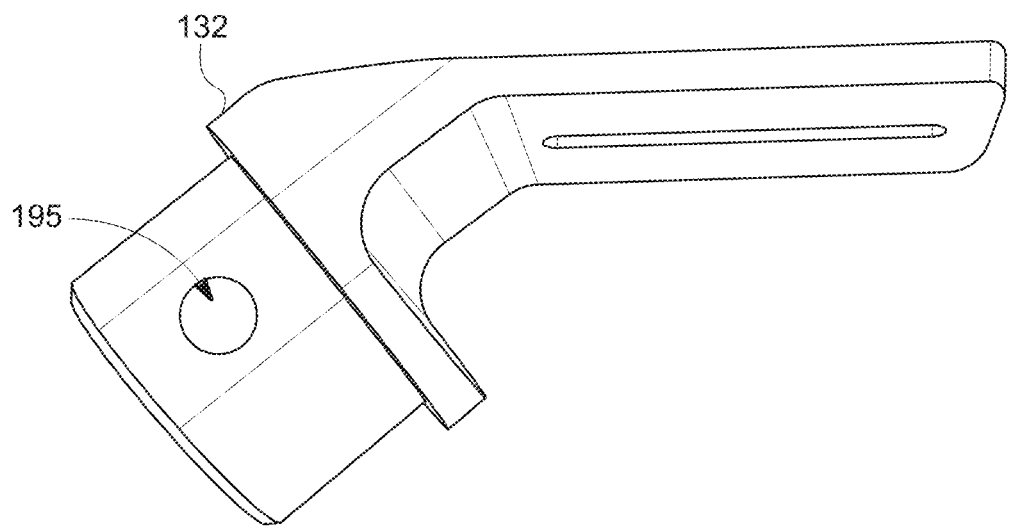

FIGS. 15A-15B illustrate a mounting platform 132 according to an example. In some examples, when the trekking staff 100 is in the tripod configuration, the mounting platform 132 may be used to support an accessory (e.g., a camera) instead of using the secondary shaft 116, as described in FIGS. 13 and 14. For example, the mounting platform 132 of FIGS. 15A-15B may allow a user to use the trekking staff 100 as a tripod from a seated or crouched position. The mounting platform 132 may insert into the cavity 168 of the housing 124 to provide a platform for optics, a rifle mount, etc. The mounting platform 132 may include a hole 195 to receive a connector (e.g., D-ring connector 130). The connector may secure the mounting platform 132 may to the housing 124. The mounting platform 132 may include a slot 196 to allow a fastener to connect an accessory to the mounting platform 132.

Figure 16:
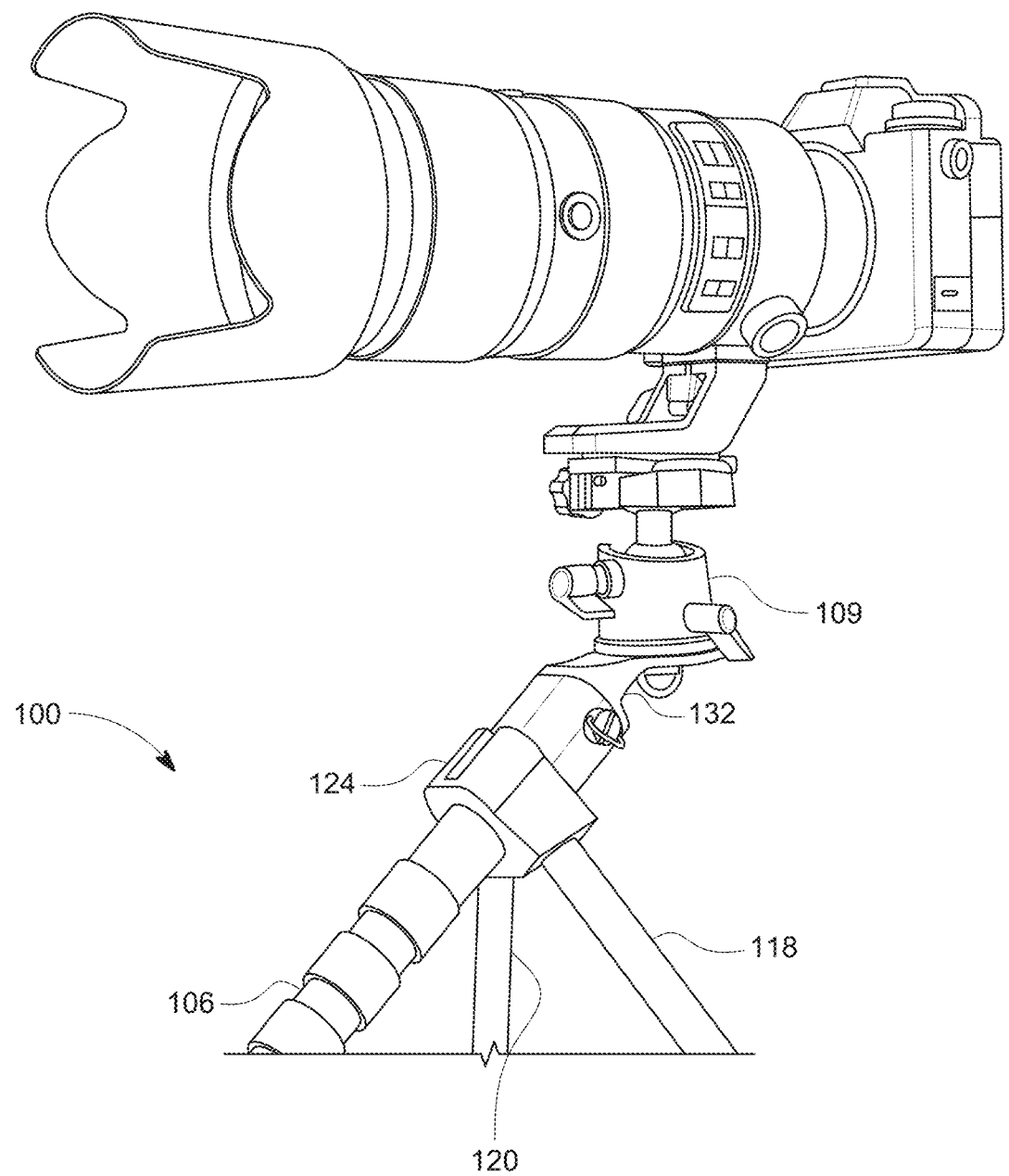
FIG. 16 illustrates the trekking staff with a mounting platform supporting a camera, according to an example.

FIG. 16 illustrates the trekking staff 100 with the mounting platform 132 supporting a camera, according to an example. In this case, the mounting platform 132 is installed within the housing 124. The concentric shafts 118, 120 are attached to the housing 124 to form a tripod with the main shaft 106. An adapter 109 is connected to the mounting platform 132 to support the camera.

Figure 17A:
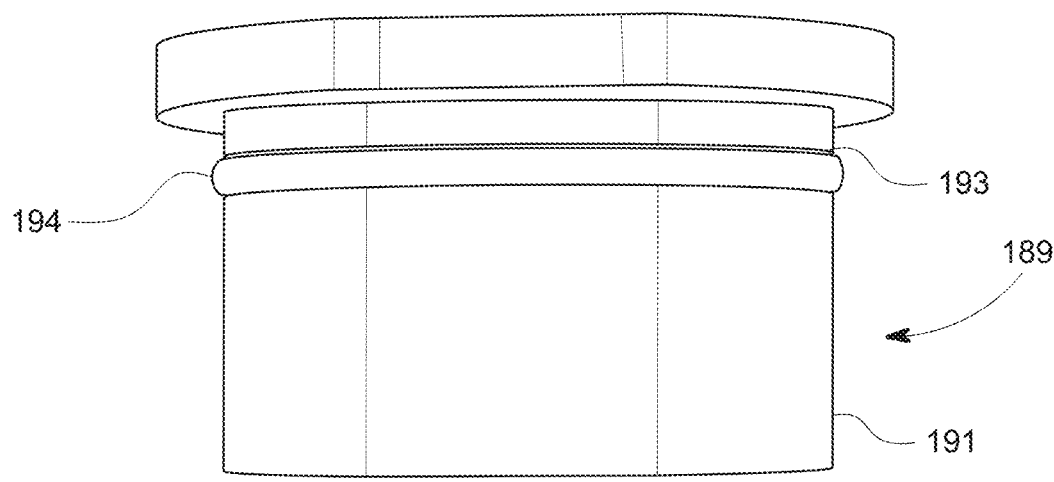
FIGS. 17A-17B illustrate another embodiment of a mounting platform according to an example.
Figure 17B:
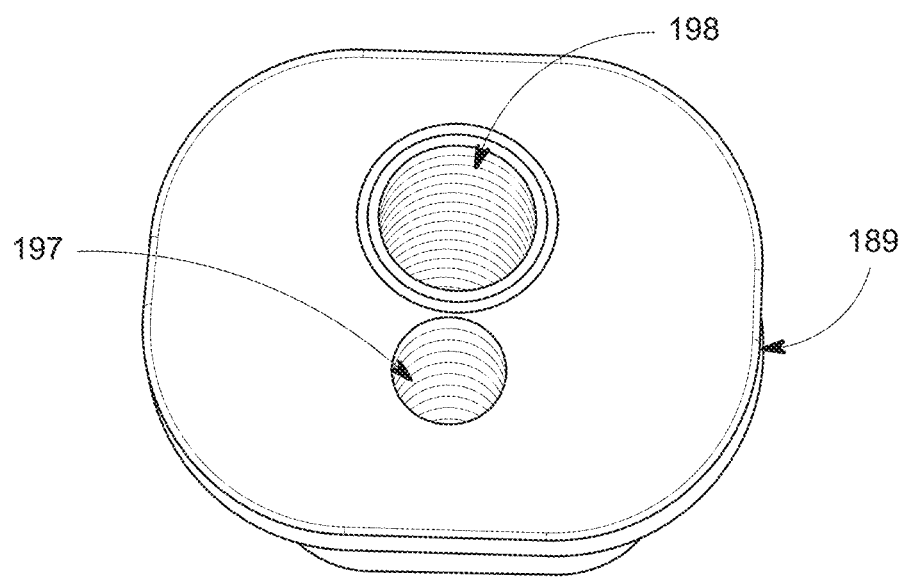

FIGS. 17A-17B illustrate another embodiment of a mounting platform 189 according to an example. In this example, the trekking staff 100 may be used in a monopod position to support an accessory (e.g., a rifle mount, optics, camera, etc.). For example, while in the trekking staff configuration, the mounting platform 189 may be inserted into the cavity 168 of the housing 124. The mounting platform 189 includes an insert structure 191 to be inserted into the cavity 168 of the housing 124. A groove 193 may be formed on the insert structure 191 to receive an elastomeric O-ring 194, which provides a tight connection between the mounting platform 189 and cavity 168 of the housing 124. In this example, the mounting platform 189 includes multiple threaded holes 197, 198 to receive different sized fasteners. For example, a first threaded hole 197 may be a ¼"-20 threaded hole and a second threaded hole 198 may be a ⅜"-16 threaded hole. It should be noted that a single threaded hole may be used. Also, the threaded holes may be of different sizes than described. In yet another example, a fastener (not shown) may be mounted to the mounting platform 189 to connect to an accessory.

Figure 18:
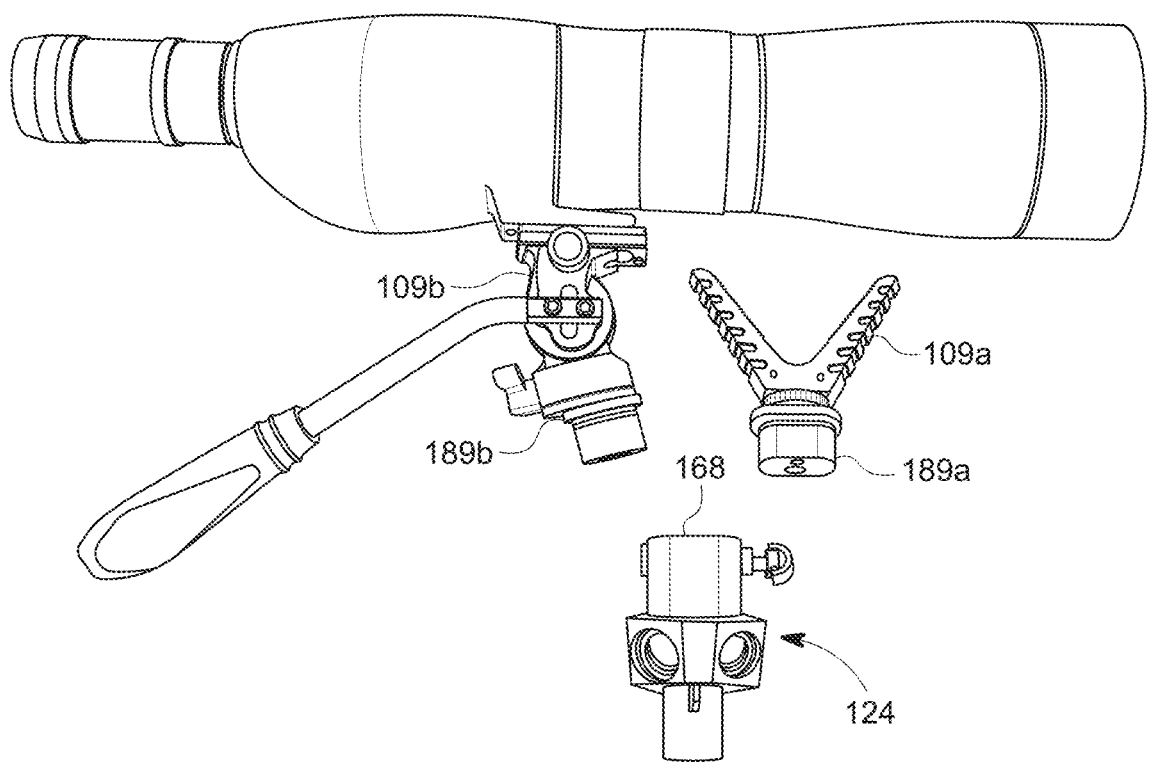
FIG. 18 illustrates a mounting platform for the trekking staff with different accessories according to an example.

FIG. 18 illustrates a mounting platform 189 for the trekking staff 100 with different accessories 109. In a first example, the mounting platform 189*a* is connected to a rifle mount 109*a*. The mounting platform 189*a* may be inserted into the cavity 168 of the housing 124. In a second example, the mounting platform 189*b* is connected to an optical scope adapter 109*b*. The mounting platform 189*b* may be inserted into the cavity 168 of the housing 124.

Figure 19:
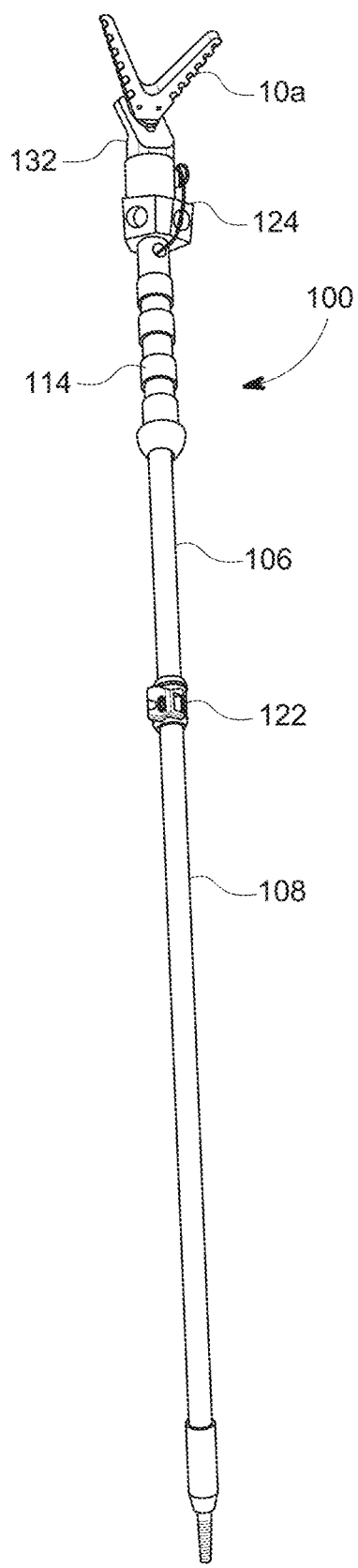
FIG. 19 illustrates the trekking staff in a monopod configuration according to an example.

FIG. 19 illustrates the trekking staff 100 in a monopod configuration. In FIG. 19 a hiker, hunter, or any person using the trekking pole 100 used in the trekking staff configuration 102 may remove the handle 110 and fit another attachment (e.g., the angled mounting platform 132 or the flat mounting platform 189) into the cavity 168 of the housing 124. It should be noted that in FIG. 19, the angled mounting platform 132 is shown inserted into the housing 124. However, different mounting platform embodiments may be used. An adapter 109 may be attached to the mounting platform 132. For example, this any adapter 109 may support a functional equipment that includes, but is not limited to, a platform for optics, a rest for a hunting rifle, a camera, binoculars, or any other optics. While in this formation, the user may use the grip 114 to hold the trekking pole 100 while in use.

The shafts, variations of the shafts, extension members, and other components described herein may be made of aluminum, carbon fiber, steel, plastic, wood, a combination thereof, or other materials. The devices described herein make a contribution to the art of hiking, backpacking, hunting, and tripods for several reasons including, but not limited to, providing lightweight, simple, stable, strong, and compactible, convertible, multipurpose, convertible staffs.

The shafts being separable, concentric, telescoping, or otherwise changeable to achieve a compact size allows the overall length of the staffs to conveniently fit inside luggage or under a seat or other location where people that are travelling would want to stow the device. It is anticipated that shafts of the tripod and bipod assemblies be fully released from each other to achieve a compact arrangement for transport or storage.

In some examples, the trekking staff 100 may include shock absorbers that include springs or pieces of elastic material that soften the impact of the trekking staff as it strikes the ground. Additionally, the trekking staff 100 may include a basket (e.g., FIG. 7, 136) which is a circular disk or cone similar to those found on ski poles. The basket may prevent tips of poles from plunging too deeply into the ground or snow, and getting wedged between roots and rocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A trekking staff comprising:
a main shaft having an interior cavity;
two concentric shafts to be removably disposed within the interior cavity of the main shaft;
a tip shaft having an interior cavity, the main shaft to be removably disposed within the interior cavity of the tip shaft; and
a housing coupled to the main shaft over the interior cavity of the main shaft, the housing to receive the two concentric shafts to form a tripod, the housing including a T-slot to receive an adapter.

2. The trekking staff in claim 1, wherein, in a first configuration, the two concentric shafts are disposed within the interior cavity to form a trekking staff configuration.

3. The trekking staff in claim 1, wherein the T-slot is configured to slidable receive the adapter.

4. The trekking staff in claim 3, wherein, in a second configuration, the two concentric shafts are removed from the main shaft and the two concentric shafts are received by an engagement structure of the housing so as to form a tripod configuration; and the adapter is slidably inserted into the T-slot.

5. The trekking staff in claim 1, wherein the housing includes a hollow sleeve adjacent to an engagement structure, the hollow sleeve to receive the main shaft.

6. A trekking staff comprising:
a main shaft having an interior cavity;
a plurality of concentric shafts to be removably disposed within the interior cavity of the main shaft;
a tip shaft having an interior cavity, the main shaft to be slidably disposed within the interior cavity of the tip shaft;
a secondary shaft having a hollow interior that removably receives the tip shaft and main shaft, the secondary shaft to be supported by a tip of the tip shaft;
a locking member to secure the main shaft at a variable position on the tip shaft and thus provides the trekking staff with a variable length;

a housing coupled to the main shaft over the interior cavity of the main shaft, the housing comprising an engagement structure to receive the plurality of concentric shafts to form a tripod; and a first configuration in which the plurality of concentric shafts are disposed within the interior cavity to form a trekking staff configuration, and a second configuration in which the plurality of concentric shafts are removed from the main shaft and the plurality of concentric shafts are received by the engagement structure of the housing so as to form a tripod configuration; a holder to be removably coupled to the housing; and the secondary shaft to be removed from the tip shaft and removably coupled to the holder to form a vertical attachment.

7. The trekking staff in claim 6, the tip shaft further including a tip with an end having a diameter larger than the secondary shaft, the tip to retain a first end of the secondary shaft to the trekking staff in the first configuration.

8. The trekking staff in claim 7, wherein the tip provides a connection interface for different attachments that are removable from the tip shaft.

9. The trekking staff in claim 8, wherein the different attachments include at least one of a fish gaff spear, a fishing rod guide, and an oaring paddle.

10. The trekking staff in claim 6, wherein in the first configuration, the locking member to retain a second end of the secondary shaft to restrict axial movement and rotation of the secondary shaft along the tip shaft.

11. The trekking staff in claim 6, wherein ends of the plurality concentric shafts include threaded fittings, and wherein the engagement structure of the housing includes threaded receiver holes to receive the threaded fittings of the plurality concentric shafts.

12. The trekking staff in claim 6, further including a mounting platform to attach to the secondary shaft in the second configuration.

13. The trekking staff in claim 6, further comprising multiple secondary shafts being in concentric form such that the multiple secondary shafts fit over the tip shaft in the first configuration.

14. A trekking staff comprising:

a main shaft having an interior cavity;

a plurality of concentric shafts to be disposed within the interior cavity of the main shaft;

a tip shaft having an interior cavity, the main shaft to be slidably disposed within the interior cavity of the tip shaft;

a locking member to secure the main shaft at a desired position on the tip shaft and thus provides the trekking staff with a desired length;

a housing coupled to the main shaft over the interior cavity of the main shaft, the housing comprising an engagement structure to receive the plurality of concentric shafts to form a tripod configuration;

a handle device to be removably coupled to the housing; and a first configuration in which the handle device is coupled to the housing and the plurality of concentric shafts are disposed within the interior cavity of the main shaft to form a trekking staff configuration, and a second configuration in which the handle device is removed from the housing and the plurality of concentric shafts are received by the engagement structure of the housing to form the tripod configuration.

15. The trekking staff in claim 14, wherein the handle device includes a hollow interior, and the trekking staff further includes a piston that is disposed within the hollow interior of the handle device, the piston to absorb shock of the two concentric shafts as the trekking staff is being used.

16. The trekking staff in claim 15, the piston to be shortened as desired to allow for miscellaneous components to be stored in the hollow interior of the handle device while the trekking staff is being used.

17. The trekking staff in claim 15, the piston comprising properties that allow the piston to be lengthened as desired to allow for components to be stored in the hollow interior of the handle device while the trekking staff is being used.

18. The trekking staff in claim 14, wherein the handle device is to be locked by a D-ring connector to the housing.

19. The trekking staff in claim 18, wherein the housing includes a threaded D-ring stay to retain the D-ring connector during removal of the handle device from the housing.

20. The trekking staff in claim 18, wherein the D-ring connector is threaded through the housing at a side on the housing.

21. The trekking staff in claim 14, wherein the top of the removable handle device is threaded to allow an item to be attached to the top of the handle device.

22. The trekking staff in claim 14, wherein the housing is configured to receive different handle devices that each have a different use.

* * * * *